(12) United States Patent
Cho et al.

(10) Patent No.: US 12,375,794 B2
(45) Date of Patent: Jul. 29, 2025

(54) ELECTRONIC DEVICE COMPRISING CAMERA AND ELECTRONIC DEVICE CONTROL METHOD

(71) Applicant: Samsung Electronics Co., Ltd., Gyeonggi-do (KR)

(72) Inventors: Hyunje Cho, Gyeonggi-do (KR); Kichul Namgung, Gyeonggi-do (KR); Yoobong Chun, Gyeonggi-do (KR); Sunggeun Joo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/597,156

(22) Filed: Mar. 6, 2024

(65) Prior Publication Data

US 2024/0267606 A1 Aug. 8, 2024

Related U.S. Application Data

(63) Continuation of application No. 17/986,538, filed on Nov. 14, 2022, now Pat. No. 11,968,439, which is a
(Continued)

(30) Foreign Application Priority Data

Jan. 8, 2018 (KR) ........................ 10-2018-0002510

(51) Int. Cl.
*H04N 23/57* (2023.01)
*G06F 21/31* (2013.01)
*H04N 23/51* (2023.01)

(52) U.S. Cl.
CPC ............. *H04N 23/57* (2023.01); *G06F 21/31* (2013.01); *H04N 23/51* (2023.01)

(58) Field of Classification Search
CPC ... G03B 11/043; G06F 1/1616; G06F 1/1658; G06F 1/1686; G06F 21/31; G06F 21/82;
(Continued)

(56) References Cited

U.S. PATENT DOCUMENTS 7,403,706 B2 7/2008 Nakao et al.
9,369,635 B1 6/2016 Hilla
(Continued)

FOREIGN PATENT DOCUMENTS

CN 1610384 A 4/2005
CN 1991660 A 7/2007
(Continued)

OTHER PUBLICATIONS

Rapid Maintenance Technology of Video Recorder dated Dec. 31, 1994.
(Continued)

*Primary Examiner* — Amy R Hsu
(74) *Attorney, Agent, or Firm* — Cha & Reiter, LLC

(57) ABSTRACT

An electronic device according to various embodiments of the present invention comprises: a housing; at least one camera disposed inside the housing; at least one door unit disposed between the housing and a lens of the at least one camera and a driving unit configured to slide the door unit such that the lens of the at least one camera can open/close, wherein the driving unit can comprise a linear actuator moving linearly according to an application of voltage. Other embodiments in addition to the various embodiments of the present invention are possible.

13 Claims, 20 Drawing Sheets

Related U.S. Application Data continuation of application No. 16/959,743, filed on Jul. 2, 2020, now Pat. No. 11,503,198, which is a continuation of application No. PCT/KR2018/016231, filed on Dec. 19, 2018.

(58) Field of Classification Search
CPC ... G06F 21/86; H04M 1/0235; H04M 1/0264; H04N 23/51; H04N 23/57
See application file for complete search history.

(56) References Cited

U.S. PATENT DOCUMENTS

| | | |
|---|---|---|
| 2003/0164895 A1 | 9/2003 | Viinikanoja et al. |
| 2004/0165108 A1 | 8/2004 | Okuda |
| 2005/0083351 A1 | 4/2005 | Kawamoto et al. |
| 2007/0153119 A1 | 7/2007 | Bilbrey |
| 2009/0185066 A1 | 7/2009 | Kotake et al. |
| 2011/0134300 A1* | 6/2011 | Chung ............... H04M 1/0254 345/173 |
| 2013/0169862 A1 | 7/2013 | Han et al. |
| 2013/0242150 A1 | 9/2013 | Wittenberg et al. |
| 2014/0311679 A1 | 10/2014 | Kim |
| 2014/0333831 A1 | 11/2014 | Oh et al. |
| 2015/0242601 A1 | 8/2015 | Griffiths et al. |
| 2015/0319378 A1 | 11/2015 | Hoelter et al. |
| 2015/0363591 A1 | 12/2015 | Chen |
| 2016/0033739 A1 | 2/2016 | Topliss |
| 2016/0105598 A1 | 4/2016 | Zeira et al. |
| 2016/0161830 A1* | 6/2016 | Gonzalez Sanchez ................ G03B 11/043 396/448 |
| 2021/0297562 A1* | 9/2021 | Azam ............... H04N 7/14 |

FOREIGN PATENT DOCUMENTS

| | | |
|---|---|---|
| CN | 101027603 A | 8/2007 |
| CN | 101487969 A | 7/2009 |
| CN | 201344987 Y | 11/2009 |
| CN | 102548304 A | 7/2012 |
| CN | 103913926 A | 7/2014 |
| CN | 104112400 A | 10/2014 |
| CN | 105205368 A | 12/2015 |
| JP | 2007-184927 A | 7/2007 |
| JP | 2009-31818 A | 2/2009 |
| JP | 3170619 U | 9/2011 |
| KR | 10-2005-0019292 A | 3/2005 |
| KR | 10-2007-0024292 A | 3/2007 |
| KR | 10-0920744 B1 | 10/2009 |
| KR | 10-2011-0054249 A | 5/2011 |
| KR | 10-2011-0063202 A | 6/2011 |
| KR | 10-1438078 B1 | 9/2014 |
| WO | 2004/028137 A2 | 4/2004 |

OTHER PUBLICATIONS

European Search Report dated Feb. 2, 2021.
Chinese Search Report dated Apr. 2, 2021.
Chinese Office Action dated Jun. 29, 2023.
European Search Report dated Nov. 15, 2023.
Chinese Office Action dated Jan. 27, 2024.
European Search report dated Jun. 5, 2025.

* cited by examiner

ELECTRONIC DEVICE COMPRISING CAMERA AND ELECTRONIC DEVICE CONTROL METHOD

CROSS-REFERENCE TO RELATED APPLICATION(S)

This application is a continuation of U.S. patent application Ser. No. 17/986,538 filed on Nov. 14, 2022, which is a Continuation of patent application Ser. No. 16/959,743 filed on Jul. 2, 2020 and assigned U.S. Pat. No. 11,503,198 issued on Nov. 15, 2022, which is a continuation of PCT/KR2018/016231 which was filed on Dec. 19, 2018, and claims priority to Korean Patent Application No. 10-2018-0002510, which was filed Jan. 8, 2018 in the Korean Intellectual Property Office, the contents of which are incorporated herein by reference.

BACKGROUND

1. Field

Various embodiments of the present disclosure relate to an electronic device including a camera and a control method of the electronic device.

2. Description of the Related Art

Electronic devices may refer to devices that perform particular functions based on embedded programs, such as home appliances, electronic notes, portable multimedia players (PMPs), and mobile communication terminals, tablet personal computers (PCs), video/audio devices, desktop/laptop computers, vehicle navigation systems, and so forth. For example, these electronic devices may output stored information in the form of sound, images, and so forth.

As one of various examples of the electronic devices, a portable computer may include a display unit for forming an image and a computer main body supporting the display and having mounted therein various hardware. Examples of the portable computer may include a laptop computer, a notebook computer, a palmtop computer, etc., that may be carried with users.

SUMMARY

As one electronic device provides various functions, electronic devices including a camera are provided. When the electronic device is hacked in various ways, an image captured by the camera included in the electronic device may leak, invading privacy.

To hide a lens of the camera included in the electronic device, a separate attachment or a door knob may be installed on the exterior of the electronic device for opening and closing. When the lens of the camera is opened or closed by the attachment installed on the exterior of the electronic device, the exterior of the electronic device may be spoiled. For example, for a laptop computer, when a separate structure for hiding the lens is attached on the exterior of window glass forming a display, a gap may be generated between a main body and the display to close the laptop computer.

Various embodiments of the present disclosure may provide an electronic device including a camera and a control method of the electronic device, in which in the electronic device, a door is disposed between a housing and a lens of the camera and the lens of the camera is opened or closed by the door.

Various embodiments of the present disclosure may provide an electronic device including a camera and a control method of the electronic device, in which in the electronic device, a door is disposed between a housing and a lens of the camera, and by controlling movement of the door based on various situations or conditions, the lens of the camera may be opened or closed by the door when a preset condition is satisfied.

According to an embodiment, an electronic device includes a housing, at least one camera disposed inside the housing, at least one door disposed between the housing and a lens of the at least one camera, and a driving unit configured to open or close the lens of the at least one camera by slidably moving the door.

According to any one of various embodiments, an electronic device includes a housing, at least one component disposed inside the housing, at least one door disposed between the housing and the at least one component, and a driving unit configured to open or close the at least one component by slidably moving the door.

According to any one of various embodiments, an electronic device includes a housing, at least one camera disposed inside the housing, at least one door disposed between the housing and a lens of the at least one camera, a driving unit configured to open or close the lens of the at least one camera by slidably moving the door, and a processor configured to transmit an electric signal for controlling the driving circuit to the driving circuit in response to reception of a predetermined input.

According to any one of various embodiments, a control method of an electronic device includes receiving a camera application execution request, transmitting a user authentication information request in response to the camera application execution request, receiving the user authentication information in response to the user authentication information request, and transmitting a control signal for opening a lens of at least one camera to a driving circuit by slidably moving a door when determining that normal authentication has been made with respect to the received user authentication information.

According to various embodiments, in an electronic device and a control method thereof, a door is disposed between a housing and a lens of a camera in the electronic device, and the lens is opened or closed by the door, thereby preventing damage of the door and preventing invasion of privacy caused by camera hacking.

According to various embodiments, in an electronic device and a control method thereof, a door is disposed between a housing and a lens of a camera in the electronic device, and the lens is opened or closed by the door, thereby opening or closing the lens without spoiling the exterior of the electronic device.

DETAILED DESCRIPTION

Figure 1A:
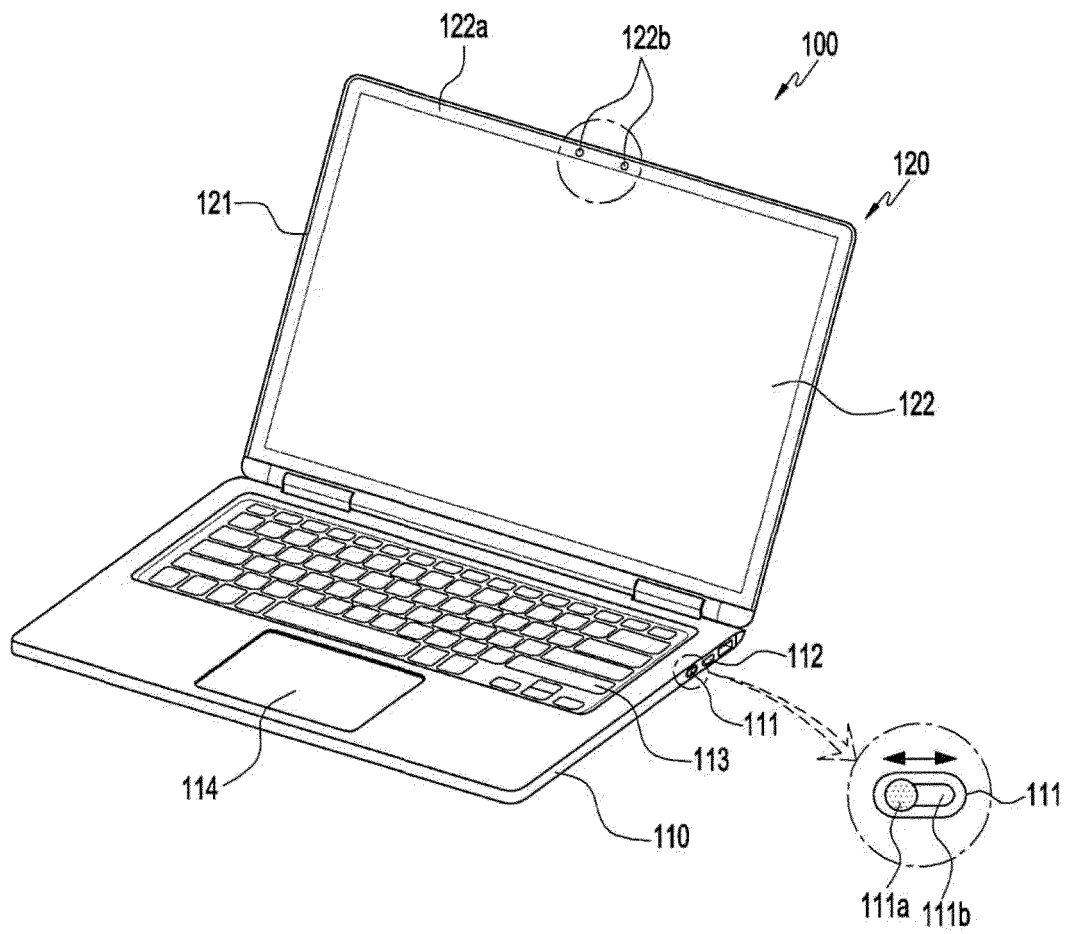
FIG. 1A is a perspective view illustrating an electronic device including a camera, according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "A/B", "at least one of A or/and B,", etc. may include all possible combinations of together listed items. As used herein, such terms as "1st" and "2nd," or "first" and "second" may be used to simply distinguish a corresponding component from another, and does not limit the components in other aspect (e.g., importance or order). When it is described that an element (such as a first element) is "operatively or communicatively coupled with/to" or "connected" to another element (such as a second element), the element can be directly connected to the other element or can be connected to the other element through another element (e.g., a third element). The term "plural or a plurality of" may mean at least two.

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, or an HMD device. The HMD device may include at least one of an accessory-type device (e.g., a watch, a ring, a bracelet, an anklet, a necklace, glasses, contact lenses, a head mounted device (HMD), or a head mounted display (HMD)), a fabric- or clothes-integrated device (e.g., electronic clothes), a body attaching-type device (e.g., a skin pad or tattoo), or a body implantable device. In some embodiments, the electronic device may include, for example, at least one of a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic frame.

In other embodiments, the electronic device may include at least one of various medical equipment (for example, various portable medical measurement devices (blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, a drone, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development.

The term "electronic device" or "user equipment (UE)" used herein may be referred to as a mobile station (MS), a terminal, a user terminal (UT), a wireless terminal, an access terminal (AT), a terminal, a subscriber unit (SU), a subscriber station (SS), a wireless device, a wireless communication device, a wireless transmit/receive unit (WTRU), a mobile node, a mobile, or other terms. Various embodiments of the terminal may include a cellular phone, a smart phone having a wireless communication function, a tablet having a wireless communication function, a wearable device having a wireless communication function, a personal digital assistant (PDA) having a wireless communication function, a wireless modem, a portable computer having a wireless communication function, a photographing device having a wireless communication function, such as a digital camera, a gaming device having a wireless communication function, a music storage and play home appliance having a wireless communication function and an Internet home appliance capable of wireless Internet connection and browsing, and portable units or terminals having integrated therein combinations of such functions. In addition, an instrument having a communication function may be included in the electronic device or the terminal.

Herein, the electronic device or the terminal may also include, but not limited to, a machine-to-machine (M2M) terminal and a machine type communication (MTC) terminal/device. The following description will be made taking a laptop computer as an example of the electronic device. However, embodiments of the present disclosure are not limited to the laptop computer.

FIG. 1A is a perspective view illustrating an electronic device including a camera, according to various embodiments of the present disclosure. Referring to FIG. 1A, the electronic device 100 according to various embodiments of the disclosure may include a main body 110 and a display 120. The display 120 may be rotatably coupled with the main body 110.

According to various embodiments, in a portion of a top surface of the main body 110, a keyboard 113 including a plurality of input keys may be disposed and a touch pad 114 capable of functioning as a mouse may be disposed. On a side surface of the main body 110, a door opening/closing switch 111 or a power button 112 may be disposed.

The door opening/closing switch 111 may be used to open or close a door according to the following embodiment or may also be used for other purposes. According to various embodiments, an arbitrary switch or button disposed for other purposes in the electronic device 100 may be used as a door opening/closing switch for opening or closing the door. According to various embodiments, the door opening/closing switch 111 may include a guide groove 111b formed therein, and switch the door into an opened state (OPEN) or a closed state (CLOSE) by moving a transition switch 111a along the guide groove 111b through user's manipulation. The power button 112 may be used to power on or off the electronic device 120, and may be included in one of the keys included in the keyboard 113. According to various embodiments, a fingerprint sensor for fingerprint recognition may be disposed on the surface of the power button 112, and the fingerprint sensor may be used to receive input of authentication information for controlling the door.

The display 120 may include a housing 121 having window glass 122 formed in at least a part of a front surface. Inside the housing 121 may be disposed a display panel for displaying the screen through the window glass 122. According to various embodiments, the display 120 may include a touch screen.

The housing 121 of the display 120 may be intended to accommodate various electronic components, and at least a portion thereof may include a conductive material. According to various embodiments, the housing 121 may include sidewalls forming an outer surface of the display 120, and a portion appearing on the exterior of the display 120 may include a metal material having conductivity. According to various embodiments, the housing 121 of the display 120 may be formed by integrating a front surface, a side surface, and a rear surface into one piece or by coupling or adhering separate components.

According to various embodiments, the window glass 122 formed on the front surface of the housing 121 may form a bezel region 122a that is opaque or has low transparency along an edge region. According to various embodiments, the bezel region 122a may be a region to which a film in a particular color is attached. According to various embodiments, a region, in the bezel region 122a, corresponding to a position in which the lens of the camera is disposed may include a transparent portion 122b. Although it is illustrated in FIG. 1A that two transparent portions 122b are formed corresponding to two cameras, various embodiments of the present disclosure are not limited thereto. For example, when one camera is disposed, one transparent portion 122b may be formed; when three or more cameras are disposed, three or more transparent portions 122b may be formed. Each camera may sense or capture an image through a lens disposed corresponding to the transparent portion 122b. While a description has been made with reference to FIG. 1A by using the transparent portion 122b of the bezel region 122a as an example of the portion in which the lens of the camera is exposed, any structure may be formed as long as it may expose the lens of the camera through a particular portion of the housing 121 according to various embodiments.

According to various embodiments of the present disclosure, the door may be disposed between each transparent portion 122b and the lens inside the housing 121, and the door may slidably move to open or close the lens. A detailed description thereof will be made below.

Figure 1B:
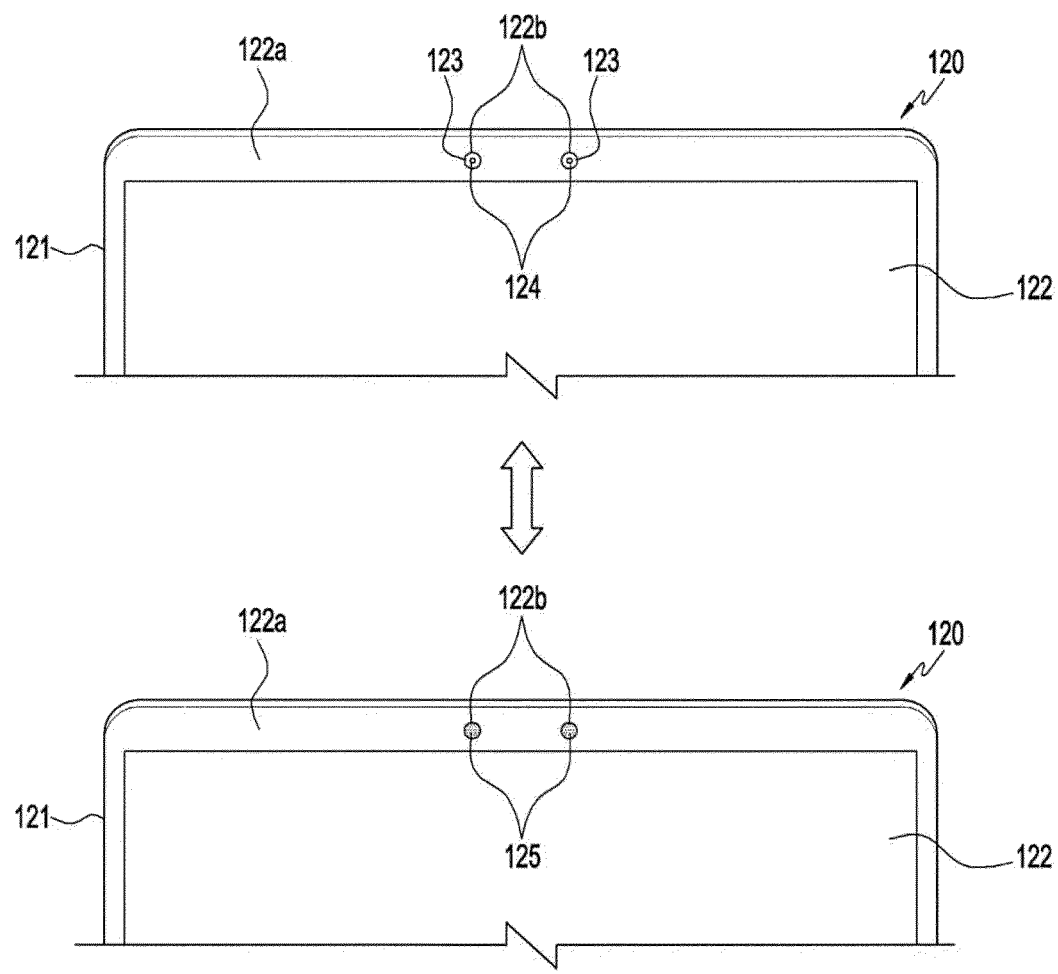
FIG. 1B illustrates opening/closing of a door portion in an electronic device including a camera, according to various embodiments of the present disclosure.

FIG. 1B illustrates opening/closing of a door portion in an electronic device including a camera, according to various embodiments of the present disclosure. Referring to FIG. 1B, when a door 125 slidably moves inside the housing 121 to open a lens 124, the lens 124 of a camera 123 may be exposed through the transparent portion 122b of the bezel region 122a as shown in an upper part of FIG. 1B. When the camera 123 is driven in the exposed state of the lens 124, the camera 123 may sense or capture an image and store the sensed or captured image in a memory of the electronic device 100.

According to various embodiments, when the door 125 slidably moves inside the housing 121 and the lens 124 is covered with the door 125, the door 125 may be exposed through the transparent portion 122*b* as shown in a lower part of FIG. 1B. As the lens 124 of the camera 123 in the transparent portion 122*b* is covered with the door 125, the outside of the electronic device 100 may not be normally photographed even when the camera 123 is normally driven. According to various embodiments, the door 125 may be manufactured as a sheet in the form of a film with various colors or a tool with a thick thickness. For example, for the door 125 being manufactured as a film having a color of red, blue, green, yellow, etc., when the door 125 is exposed through the transparent portion 122*b*, the user may check the color of the door 125 exposed through the transparent portion 122*b* and determine that the lens 124 is covered with the door 125. According to various embodiments, even when a processor or a system of the electronic device 100 is hacked and thus the camera 123 is driven and captures an image, differently from user's intention, the image covered with the door 125 is captured, thus preventing the risk of invasion of privacy.

Hereinbelow, a description will be made of a structure in which the lens 124 of the camera 123 is opened or closed by controlling the door 125 inside the housing 121 according to various embodiments of the present disclosure.

Figure 2:
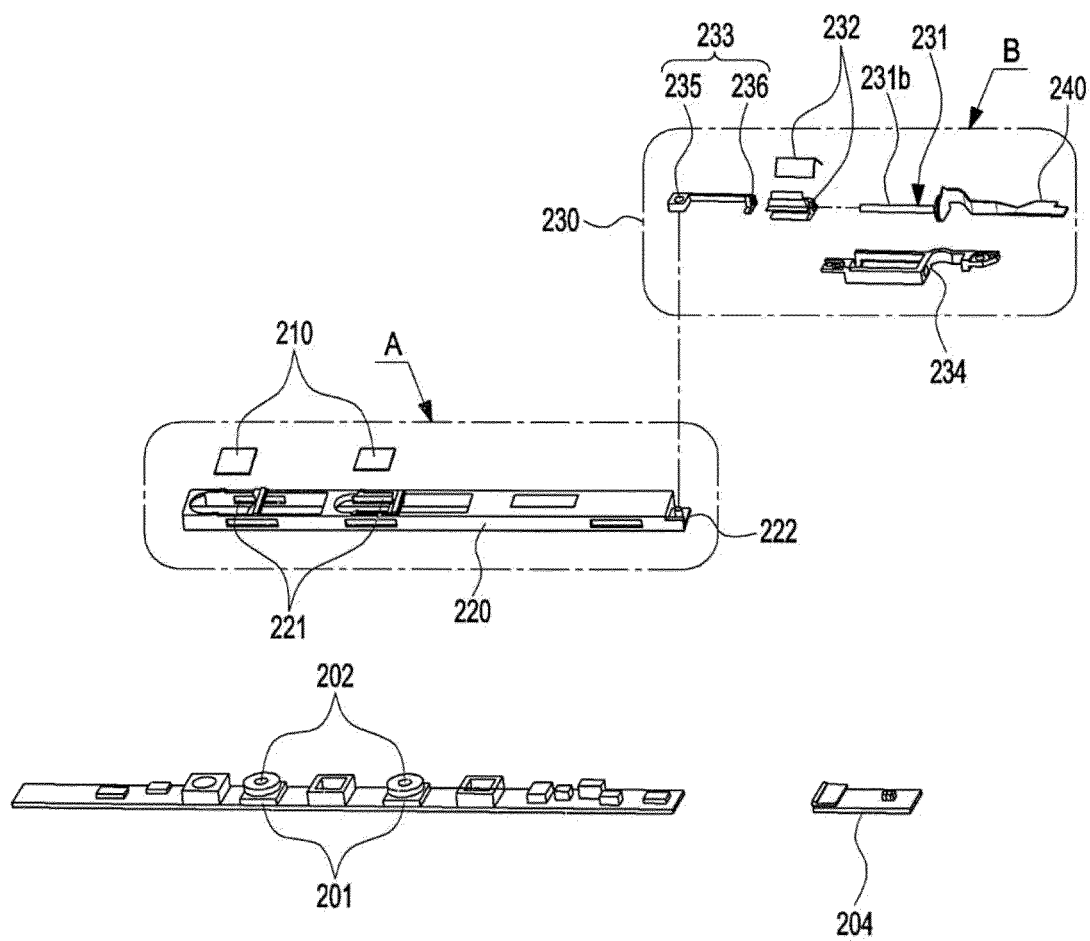
FIG. 2 is an exploded perspective view illustrating a structure of an electronic device including a camera, according to various embodiments of the present disclosure.

FIG. 2 is an exploded perspective view illustrating a structure of an electronic device 200 including a camera 201, according to various embodiments of the present disclosure.

Referring to FIG. 2, the electronic device 200 (e.g., the electronic device 100 of FIG. 1A) according to various embodiments may include at least one of a housing (e.g., the housing 121 of FIG. 1A), at least one camera 201 (e.g., the camera 123 of FIG. 1B), at least one door 210 (e.g., the door 125 of FIG. 1B), a sliding unit 220, or a driving unit 230. For example, the at least one door 210 may be disposed between the housing and a lens 202 of the at least one camera 201 to open or close the lens 202 (e.g., the lens 124 of FIG. 1B) of the at least one camera 201 by being slidably moved by the sliding unit 220. According to various embodiments, the at least one door 210 may be disposed between a rear surface of the housing of the electronic device 200 and the lens 202 of the camera 201.

According to an embodiment, the electronic device 200 may include, for example, a laptop computer, a portable communication device (e.g., a smart phone), a computer device, a portable multimedia device, a portable medical device, a wearable device, or a home appliance. According to an embodiment of the disclosure, the electronic devices are not limited to those described above. In the current embodiment, a description will be made taking a laptop computer as an example of the electronic device.

According to an embodiment, the housing included in the electronic device 200 may include at least one of window, a front case, a rear case, or an inner case and an outer case of the electronic device 200. The housing may include other components than the disclosed components.

The at least one door 210 may include a sheet in the form of a film (e.g., a polycarbonate (PC) sheet). According to various embodiments, the at least one door 210 may be manufactured as an injection-molded product having a thin thickness. In an embodiment of the present disclosure, the at least one door 210 may be described using, without being limited to, a PC sheet as an example. For example, the at least one door 210 may be variously applied as a sheet in the form of a film, a tool having a thin thickness, etc.

The sliding unit 220 may be coupled with the at least one door 210 to slidably move the at least one door 210.

The driving unit 230 may be disposed adjacent to the sliding unit 220 and provide a driving force to slidably move the sliding unit 220 by applying a voltage.

As such, by arranging the at least one door 210 that slidably moves by applying a voltage, on the front surface of the lens 202 of the camera 201, opening/closing of the lens 202 may be controlled under various situations.

Figure 3:
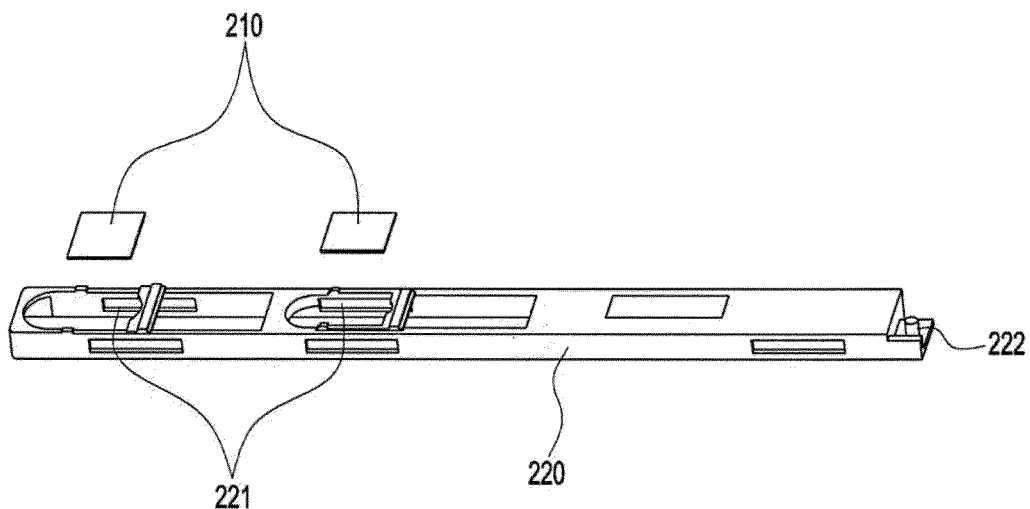
FIG. 3 is an enlarged exploded perspective view of a portion A of FIG. 2.

FIG. 3 is an enlarged exploded perspective view of a portion A of FIG. 2, showing the sliding unit 220.

Referring to FIG. 3, the sliding unit 220 may include at least one coupling hole 221 for coupling with the at least one door 210. For example, the at least one door 210 may be coupled with the at least one coupling hole 221 formed on the front surface of the sliding unit 220, and in this state, as the sliding unit 220 is slidably moved by the driving unit 230, the at least one coupling hole 221 may also slidably move and the at least one door 210 coupled with the at least one coupling hole 221 may also slidably move. In this way, as the at least one door 210 coupled with the at least one coupling hole 221 slidably moves, the lens 202 of the camera 201 may be opened or closed.

According to an embodiment, an engaging unit 222 engaged with a first coupling unit 235 of a link unit 233 of the driving unit 230 described below may be provided in an end of the sliding unit 220. For example, the first coupling unit 235 may be formed in a first end 233*a* of the link unit 233, and the engaging unit 222 of the sliding unit 220 may be coupled to the first coupling unit 235. In this state, when the link unit 233 is slidably moved by the driving unit 230, the sliding unit 220 coupled with the link unit 233 may slidably move together.

Figure 4:
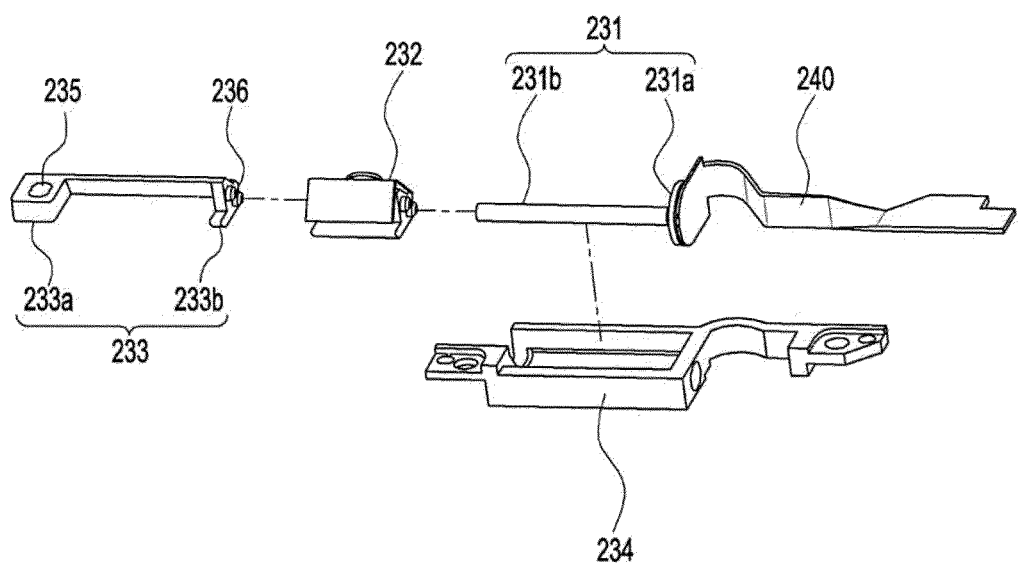
FIG. 4 is an enlarged exploded perspective view of a portion B of FIG. 2.
Figure 5:
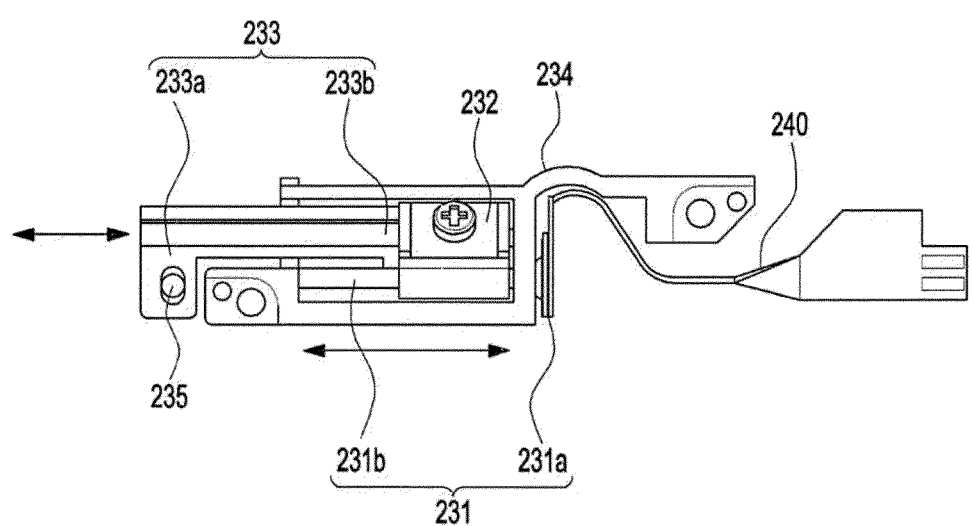
FIG. 5 is a plane view showing a coupled state of a driving unit in an electronic device including a camera, according to various embodiments of the present disclosure.

FIG. 4 is an enlarged exploded perspective view of a portion B of FIG. 2, showing the driving unit 230, and FIG. 5 is a plane view showing a coupled state of the driving unit 230 in the electronic device 200 including the camera 201, according to various embodiments of the present disclosure.

Referring to FIGS. 4 and 5, the driving unit 230 may include a linear actuator 231, a moving unit 232, the link unit 233, and a support member 234. For example, the linear actuator 231 may linearly move by applying a voltage through a connecting unit 204 included in the electronic device 200. According to various embodiments, the linear actuator 231 may include any component that linearly moves by applying a voltage, for example, at least one of a linear vibration motor, a piezo vibration motor, a step motor, etc.

The moving unit 232 may be coupled with the linear actuator 231 to slidably move together with the linear movement of the linear actuator 231. The link unit 233 may be disposed between the sliding unit 220 and the moving unit 232 to slidably move the sliding unit 220 by delivering the slidable movement of the moving unit 232 to the sliding unit 220. The support member 234 may be coupled with and at the same time, support the linear actuator 231, the moving unit 232, and the link unit 233.

According to an embodiment, the first end 233*a* of the link unit 233 may form the first coupling unit 235 engaged with the engaging unit 222 included in the sliding unit 220, and a second end 233*b* of the link unit 233, which is opposite to the first end 233*a*, may form a second coupling unit 236 engaged with the moving unit 232.

According to an embodiment, the support member 234 may include a flexible printed circuit board (FPCB) 240 to apply a voltage to the linear actuator 231 according to an electric signal transferred through the connector 204 included in the electronic device 200. For example, the FPCB 240 may be electrically connected with the linear actuator 231 to apply a voltage to the linear actuator 231.

Figure 6:
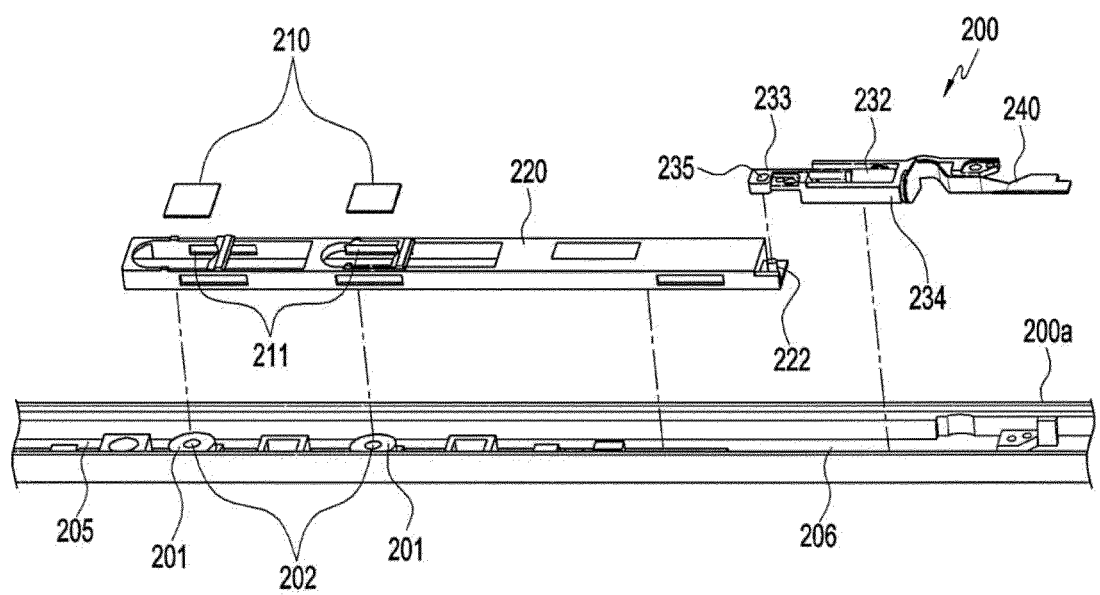
FIG. 6 is an exploded perspective view showing a before-coupling state of an electronic device including a camera, according to various embodiments of the present disclosure.

FIG. 6 is an exploded perspective view showing a before-coupling state of the electronic device 200 including the camera 201, according to various embodiments of the present disclosure.

Referring to FIG. 6, the electronic device 200 may include the at least one camera 201, the at least one door unit 210, the sliding unit 220, and the driving unit 230. The at least one camera 201 may be mounted on a camera mounting unit 205 included in the electronic device 200. The camera mounting unit 205 may include an exterior 200b or an interior 200a of the electronic device 200. The at least one camera 201 mounted on the camera mounting unit 205 may be coupled with the sliding unit 220. The sliding unit 220 may include the at least one coupling hole 221 coupled with the at least one camera 201, such that the at least one coupling hole 221 of the sliding unit 220 may be coupled with the at least one camera 201. As the at least one coupling hole 221 is coupled with the at least one door unit 210, the at least one coupling hole 221 is coupled with the camera and at the same time, the at least one door 210 may be disposed on the front surface of the lens 202 of the at least one camera 201. The engaging unit 222 formed in an end of the sliding unit 220 may be coupled by engagement with the first coupling unit 235 formed in the first end 233a of the link unit 233. The driving unit 230 may be placed on a driving settling unit 206 included in the electronic device 200.

Figure 7:
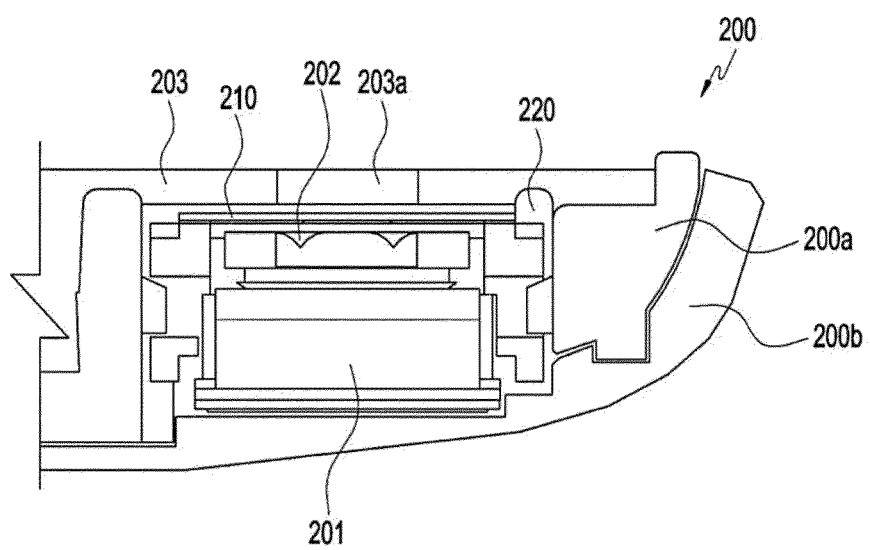
FIG. 7 is a side cross-sectional view illustrating a structure of an electronic device including a camera, according to various embodiments of the present disclosure.

FIG. 7 is a side cross-sectional view illustrating a coupled state of the electronic device 200 including the camera 201, according to various embodiments of the present disclosure.

Referring to FIG. 7, the at least one camera 201 may be mounted on the camera mounting unit 205 of the electronic device 200, the at least one coupling hole 221 of the sliding unit 220 may be coupled with the at least one camera 201, and the at least one door 210 may be coupled with the top surface of the at least one coupling hole 221. The at least one door 210 may be disposed on the front surface of the lens 202 of the camera 201. On the front surface of the at least one door 210 may be disposed the window glass 203 of the electronic device 200 (e.g., the window glass 122 of FIG. 1A). The at least one door 210 may be disposed under a transparent portion 203a (e.g., the transparent portion 122b of FIG. 1A) of the window glass 203. For example, the at least one door 210 may be disposed under the transparent portion 203a of the window glass 203, and the lens 202 of the camera 201 may be disposed under the at least one door 210. In this state, when the at least one door 210 opens the lens 202 of the camera 201 by slidably moving, the lens 202 of the camera 201 may capture the image through the transparent portion 203a of the window glass 203.

As such, the at least one door 210 may be disposed between the transparent portion 203a of the window glass 203 and the lens 202 of the camera 201, thereby preventing the at least one door 210 from being exposed to outside and being damaged.

According to an embodiment, the linear actuator 231 may include a piezoelectric plate 231a that causes physical displacement by applying a voltage and a moving shaft 231b that is attached perpendicularly to the piezoelectric plate 231a and linearly moves along with displacement of the piezoelectric plate 231a. For example, the linear actuator 231 may include the piezoelectric plate 231a that includes electrodes on opposite surfaces thereof and causes physical displacement by applying a voltage and may include an elastic body (not shown) attached on a surface or the opposite surfaces of the piezoelectric plate 231a, and the moving shaft 231b may be fixedly attached perpendicularly to the piezoelectric plate 231a or the elastic body (not shown). The piezoelectric plate 231a may include the form of a circular plate, and according to an input voltage, vibration may be generated in a direction from an external diameter of the piezoelectric plate 231a or an internal diameter of the piezoelectric plate 231a in the form of a circular plate or in a direction from the internal diameter to the external diameter, thus performing curved movement. For example, the curved movement may mean vibrating movement that moves into the center of the piezoelectric plate 231a in the form of a circular plate or moves out from the center by the elastic body (not shown) according to a voltage input to the piezoelectric plate 231a. The piezoelectric plate 231a may deliver the vibrating movement to the moving shaft 231b and switch the vibrating movement into the linear movement. For example, by applying a voltage to the linear actuator 231 in a state where the piezoelectric plate 231a and the elastic body (not shown) are attached, vibration may occur in the piezoelectric plate 231a and the elastic body (not shown) and may be delivered to the moving shaft 231b. The moving unit 232 may be coupled with the moving shaft 231b in such a way to slidably move, such that as the moving shaft 231b linearly moves along with vibration, the moving unit 232 may slidably move while linearly moving together with the moving shaft 231b. As the moving unit 232 slidably moves, the moving unit 232 may slidably move the sliding unit 220 and the at least one door 210 included in the sliding unit 220 may also slidably move together with the slidable movement of the sliding unit 220.

Thus, as the at least one door 210 slidably moves, the lens 202 of the camera 201 may be opened or closed.

The driving unit 230 may include the linear actuator 231 that may include at least one of a linear vibration motor, a piezoelectric vibration motor, or a step motor. In an embodiment of the present disclosure, the driving unit 230 will be described using, but not limited to, the linear actuator 231 as an example, and the driving unit 230 may use various motors as long as the motor slidably moves the moving unit 232 by applying a voltage.

Figure 8A:
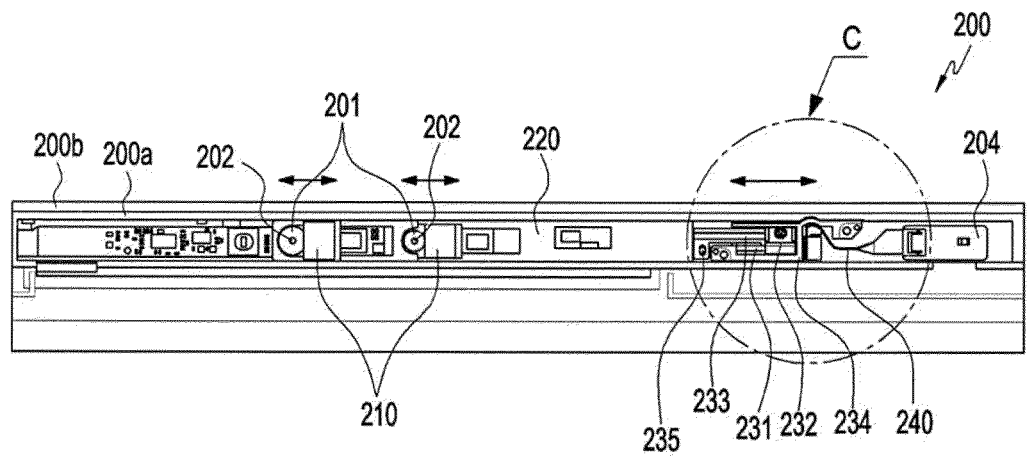
FIG. 8A is a plane view showing a state in which a door portion opens a lens of a camera in an electronic device including the camera, according to various embodiments of the present disclosure.
Figure 8B:
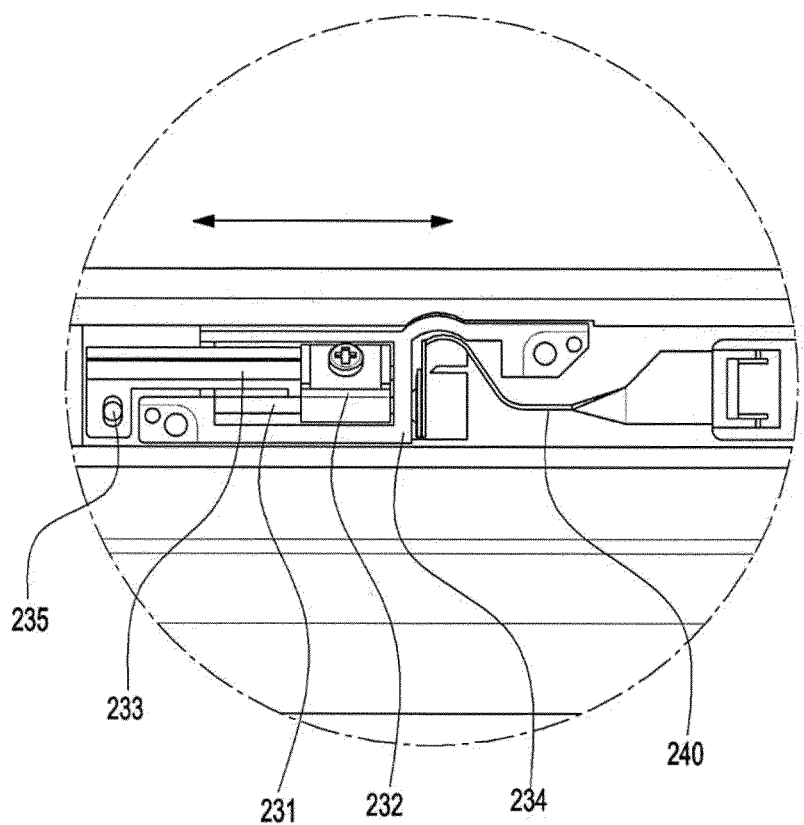
FIG. 8B is an enlarged plane view of a portion C of FIG. 8A.

FIG. 8A is a plane view showing a state in which the door 210 opens the lens 202 of the camera 201 in the electronic device 200 including the camera 201, according to various embodiments of the present disclosure, and FIG. 8B is an enlarged plane view of a portion C of FIG. 8A.

Referring to FIGS. 8A and 8B, when the at least one door 210 opens the lens 202 of the camera 201, the piezoelectric plate 231a and the elastic body (not shown) may generate vibration by applying a voltage to the linear actuator 231. The vibration may be delivered to the moving shaft 231b that may linearly move due to the vibration. The moving shaft 231b may be coupled with the moving unit 232 in such a way to slidably move, such that as the moving shaft 231b linearly moves, the moving unit 232 may slidably move from left to right along the moving shaft 231b. When the moving unit 232 slidably moves from left to right, the sliding unit 220 may slidably move from left to right together with the moving unit 232 and the at least one door 210 included in the sliding unit 220 may also slidably move from left to right. As the at least one door 210 slidably moves, the at least one door 210 may open the lens 202 of the camera 201. The user may capture various images through the opened lens 202 of the camera 201.

Figure 9A:
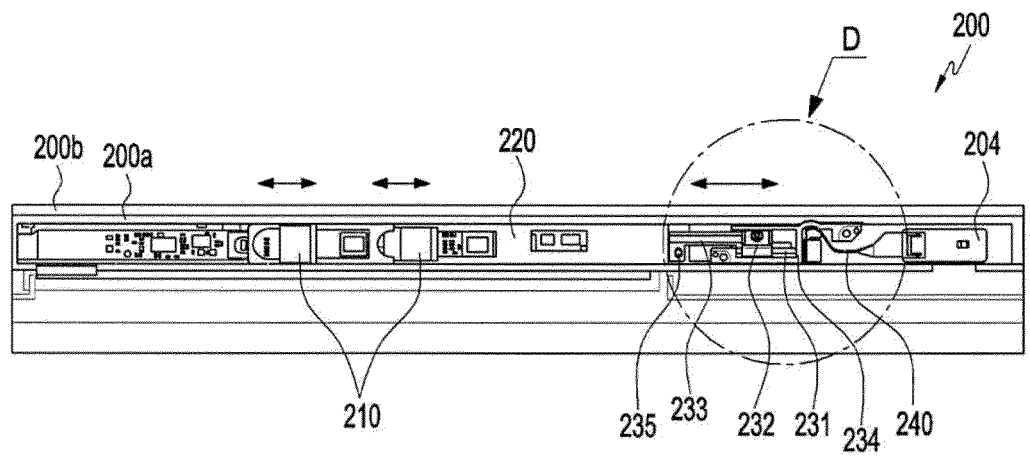
FIG. 9A is a plane view showing a state in which a door portion closes a lens of a camera in an electronic device including the camera, according to various embodiments of the present disclosure.
Figure 9B:
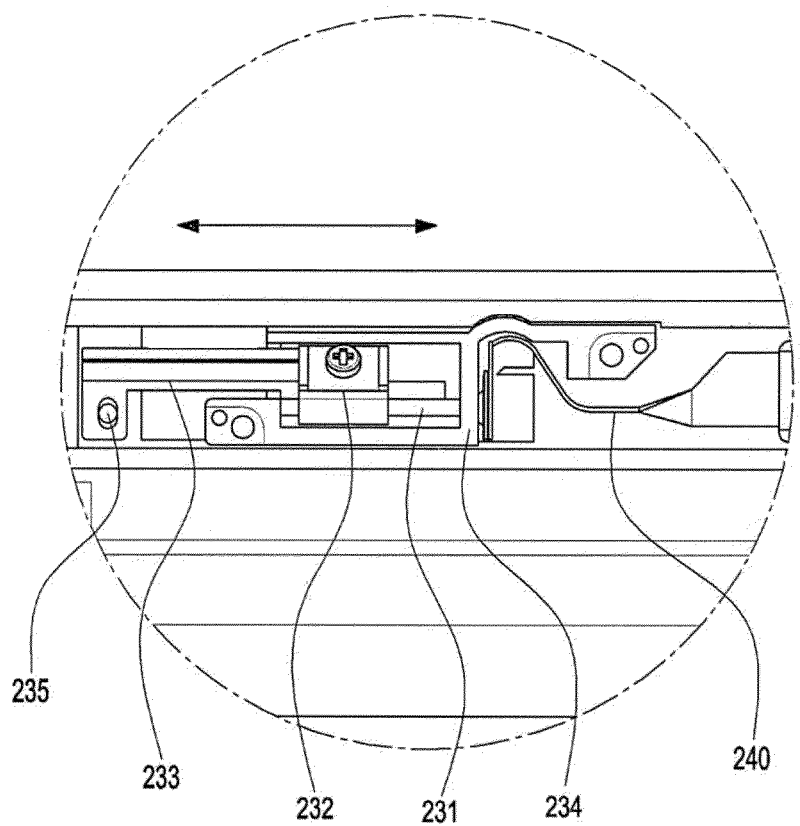
FIG. 9B is an enlarged plane view of a portion D of FIG. 9A.

FIG. 9A is a plane view showing a state in which the door 210 closes the lens 202 of the camera 201 in the electronic device 200 including the camera 201, according to various embodiments of the present disclosure, and FIG. 9B is an enlarged plane view of a portion D of FIG. 9A.

Referring to FIGS. 9A and 9B, when the at least one door 210 closes the lens 202 of the camera 201, the piezoelectric plate 231a and the elastic body (not shown) may generate vibration by applying a voltage to the linear actuator 231, and the vibration may be delivered to the moving shaft 231b. The moving shaft 231b may linearly move due to the vibration. The moving shaft 231b may be coupled with the moving unit 232 in such a way to slidably move, such that as the moving shaft 231b linearly moves, the moving unit 232 may slidably move from right to left along the moving shaft 231b. When the moving unit 232 slidably moves from right to left, the sliding unit 220 may slidably move from right to left together with the moving unit 232 and the at least one door 210 included in the sliding unit 220 may also slidably move from right to left. As the at least one door 210 slidably moves, the at least one door 210 may close the lens 202 of the camera 201. Thus, the user may prevent invasion of privacy, caused by hacking, by controlling opening/closing of the lens 202 of the camera 201.

An electronic device (e.g., the electronic device 100 of FIG. 1A or the electronic device 200 of FIG. 2) according to any one of various embodiments of the present disclosure may include a housing, at least one camera disposed inside the housing, at least one door disposed between the housing and a lens of the at least one camera, and a driving unit configured to open or close the lens of the at least one camera by slidably moving the door, in which the driving unit includes a linear actuator that linearly moves by applying a voltage.

According to various embodiments of the present disclosure, the electronic device may further include a sliding unit coupled with the at least one door and slidably moving according to movement of the driving unit.

According to various embodiments of the present disclosure, the at least one door may include a sheet (e.g., a PC sheet) in the form of a film or a tool having a thin thickness.

According to various embodiments of the present disclosure, the at least one door may be disposed between window glass forming a surface of the housing and the lens of the camera.

According to various embodiments of the present disclosure, the sliding unit may further include at least one coupling groove coupling the at least one door.

According to various embodiments of the present disclosure, the driving unit may include a moving unit coupled to the linear actuator and slidably moving according to linear movement of the linear actuator, a link unit disposed between the sliding unit and the moving unit and slidably moving the sliding unit by delivering slidable movement of the moving unit to the sliding unit, and a support member supporting at least one of the linear actuator, the moving unit, or the link unit.

According to various embodiments of the present disclosure, the link unit may be configured integrally with or separately from the moving unit.

According to various embodiments of the present disclosure, a first end of the link unit may form a first coupling unit engaged with an engaging unit included in the sliding unit, and a second end opposite to the first end may form a second coupling unit engaged with the moving unit.

According to various embodiments of the present disclosure, the linear actuator may include at least one of a linear vibration motor, a piezo vibration motor, or a step motor.

According to various embodiments of the present disclosure, the driving unit may further include a flexible printed circuit board (FPCB) coupled with the support member and applying the voltage to the linear actuator according to an electric signal received from a processor included in the electronic device.

According to any one of various embodiments, an electronic device may include a housing, at least one component disposed inside the housing, at least one door disposed between the housing and the at least one component, and a driving unit configured to open or close the at least one component by slidably moving the door, in which the driving unit includes a linear actuator that linearly moves by applying a voltage.

According to any one of various embodiments, the at least one component may include at least one of a lens of a camera, at least one sensor module, a key button, a connector, an audio output device, or a microphone.

Figure 10A:
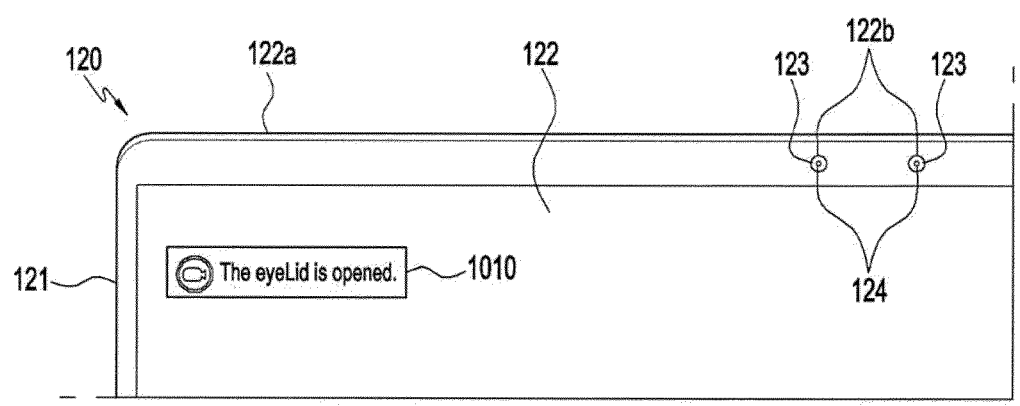
FIGS. 10A and 10B show a screen displayed in an electronic device, according to various embodiments of the present disclosure.
Figure 10B:
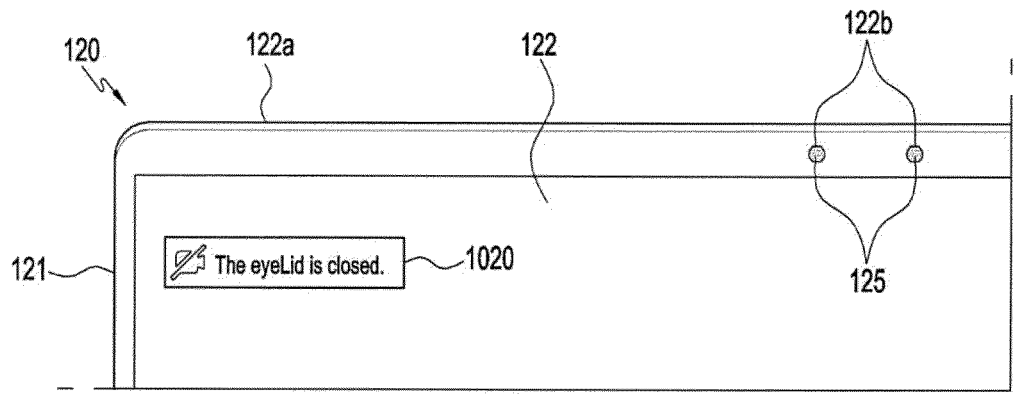

FIGS. 10A and 10B show a screen displayed in an electronic device (e.g., the electronic device 100 of FIG. 1A or the electronic device 200 of FIG. 2), according to various embodiments of the present disclosure. Referring to FIGS. 10A and 10B, messages 1010 and 1020 indicating an opened/closed state of the lens may be displayed on a screen displayed through the window glass 122 of the display 120, according to various embodiments of the present disclosure.

According to various embodiments, as shown in FIG. 10A, when the door 125 moves to open the lens 124 of the camera 123, the lens 124 of the camera 123 may be exposed through the transparent portion 122b of the bezel region 122a. According to various embodiments, when the lens 124 of the camera 123 is exposed through the transparent portion 122b of the bezel region 122a, a message "The eyeLid is opened" may be displayed on the screen of the display 120.

According to various embodiments, as shown in FIG. 10B, when the door 125 moves to the transparent portion 122b of the bezel region 122a and thus the lens 124 of the camera 123 is covered with the door 125, a message "The eyeLid is closed" may be displayed on the screen of the display 120.

Figure 11:
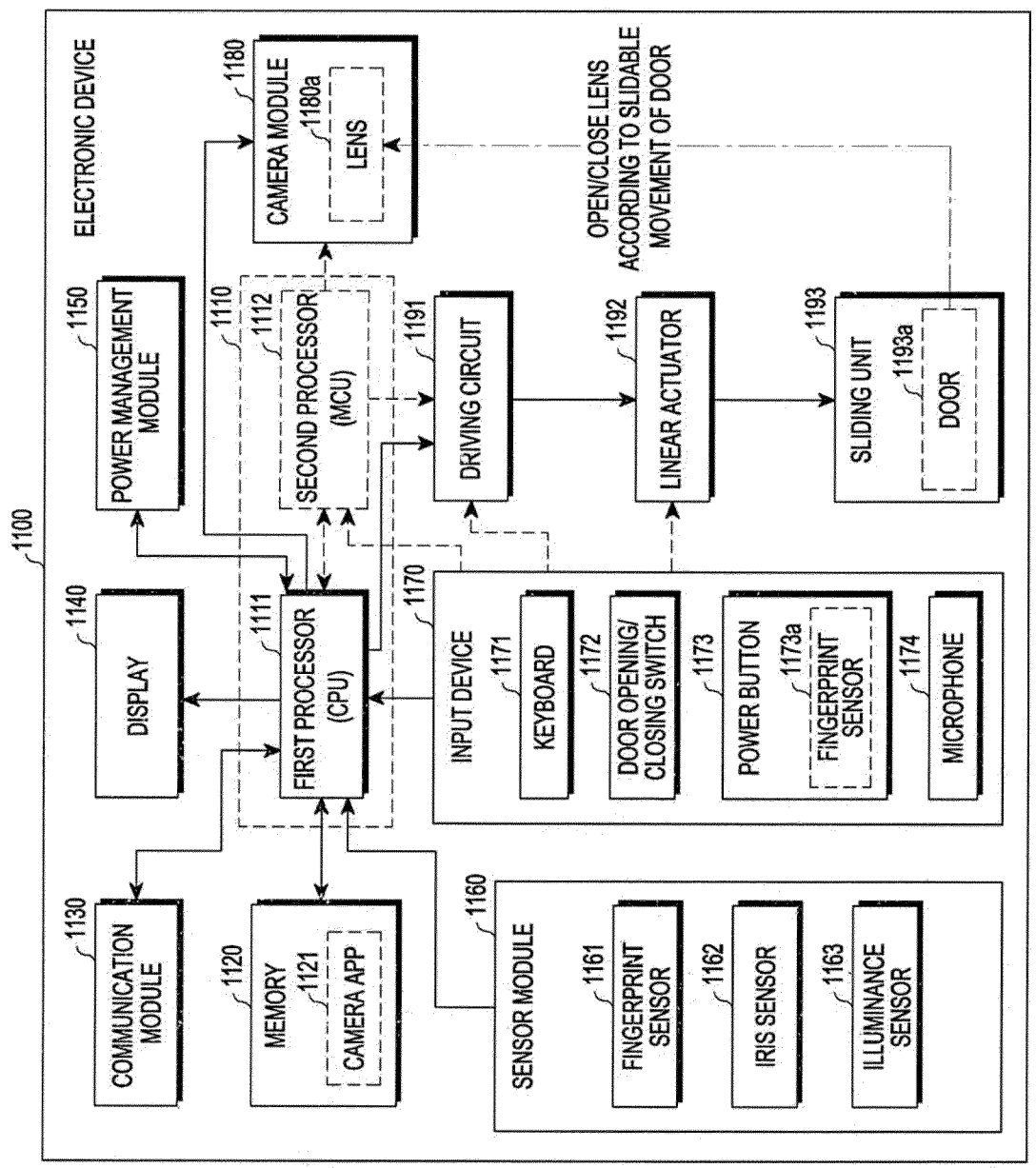
FIG. 11 is a block diagram illustrating a structure of an electronic device according to various embodiments of the present disclosure.

FIG. 11 is a block diagram of an electronic device 1100 according to various embodiments of the present disclosure. Referring to FIG. 11, the electronic device 1100 according to various embodiments of the present disclosure (e.g., the electronic device 100 of FIG. 1A or the electronic device 200 of FIG. 2) may include a processor 1110, a memory 1120, a communication module 1130, a display 1140 (e.g., the display 120 of FIG. 1A), a power management module 1150, a sensor module 1160, an input device 1170 (e.g., the door opening/closing switch 111, the power button 112, the keyboard 113, or the touch pad 114 of FIG. 1A), and a camera module 1180 (e.g., the camera 123 of FIG. 1B or the camera 201 of FIG. 2).

According to various embodiments of the present disclosure, the electronic device 1100 may further include a door 1193a (e.g., the door 125 of FIG. 1B or the door 210 of FIG. 2) for opening/closing a lens 1180a of the camera module 1180 (e.g., the lens 124 of FIG. 1B or the lens 202 of FIG. 2). The door 1193a may be fixed on a sliding unit 1193 and may slidably move to open/close the lens 1180a when the sliding unit 1193 slidably moves together with linear movement of the linear actuator 1192.

The linear actuator 1192 may be driven by a voltage applied by a driving circuit 1191 to linearly move. The driving circuit 1191 may receive a control signal from the processor 1110 (e.g., a first processor 1111 or a second processor 1112) to drive the linear actuator 1192. According to various embodiments, the driving circuit 1191 may receive a predetermined input signal input through the input device 1170 and be driven. According to various embodiments, the driving circuit 1191 may be manufactured in the form of an integrated circuit (IC) or a chip. According to various embodiments, the driving circuit 1191 may be mounted on a main board or a separate circuit board, together with the first processor 1111 or the second processor 1112. According to various embodiments, the first processor 1111 or the second processor 1112 may perform control by generating a pulse width modulation (PWM) signal as a control signal for controlling the driving circuit 1191, and embodiments of the present disclosure are not limited to the foregoing signal form.

The input device 1170 may include at least one of a keyboard 1171 (e.g., the keyboard 113 of FIG. 1A), a door opening/closing switch 1172 (e.g., the door opening/closing switch 111 of FIG. 1A), a power button 1173 (e.g., the power button 112 of FIG. 1A), a touch pad (e.g., the touch pad 114 of FIG. 1A), or a microphone 1174. When the input device 1170 receives an input corresponding to control of the door 1193a, an input signal corresponding to the input may be transmitted to the processor 1110 to control movement of the door 1193a. According to various embodiments, when the input device 1170 receives an input corresponding to control of the door 1193a, an input signal corresponding to the input may be transmitted directly to the driving circuit 1191 or the linear actuator 1192 without passing through the processor 1110, so as to control movement of the door 1193a.

According to various embodiments, a preset key is input among a plurality of input keys of the keyboard 1171 of the input device 1170, the processor 1110 may determine the input as an input for controlling movement of the door 1193a. The preset key may include a combination of two or more plural input keys.

According to various embodiments, when the door opening/closing switch 1172 of the input device 1170 is manipulated and thus the electronic device 1100 switches to an opened or closed state, the processor 1110 may determine transition of the door opening/closing switch 1172 as an input for controlling movement of the door 1193a.

According to various embodiments, when the power of the electronic device 1100 switches from the on state to the off state or from the off state to the on state upon pressing of the power button 1173 of the input device 1170, then the processor 1110 may be powered on or off and at the same time, control movement of the door 1193a. For example, when the power of the electronic device 1100 switches from the on state to the off state, the door 1193a may be moved such that the lens 1180a of the camera module 1180 may 1180 may become the closed state. When the power of the electronic device 1100 switches from the off state to the on state, the door 1193a may be moved such that the lens 1180a of the camera module 1180 may be opened.

The sensor module 1160 may include at least one of a fingerprint sensor 1161, an iris sensor 1162, or an illuminance sensor 1163. According to various embodiments, when a camera app 1121 is stored in the memory 1120, the electronic device 1100 may request user authentication and sense a user's biometric authentication information through the sensor module 1160, thus performing user authentication. When a result of authentication is normal authentication, the processor 1110 may transmit a control signal to the driving circuit 1191 which may then provide a voltage to the linear actuator 1192 according to the transmitted control signal, thus slidably moving the sliding unit 1193. As the sliding unit 1193 slidably moves, the door 1193a fixed to the sliding unit 1193 slidably moves together, thus opening/closing the lens 1180a of the camera module 1180.

According to various embodiments, upon execution of the camera app 1121 stored in the memory 1120, the electronic device 1100 may identify a network connection state through the communication module 1130 and may additionally request user authentication because of the risk of hacking in the network-connected state. For example, when the processor 1110 determines that the network is connected through the communication module 1130, the processor 1110 may request user authentication information, receive the user authentication information through the sensor module 1160, and move the door 1193a in case of normal authentication to open the lens 1180a of the camera module 1180.

The processor 1110 may include one processor, the first processor 1111 (e.g., a central processing unit (CPU) or an application processor (AP)) or two processors, the first processor 1111 and the second processor 1112 (e.g., a micro controller unit (MCU)). According to various embodiments, the second processor 1112 may operate in association with or independently of the first processor 1111 for a particular function. For example, the second processor 1112 may move the door 1193a by independently controlling the driving circuit 1191. According to various embodiments, even when the first processor 111 is hacked by a hacker, invasion of privacy may be prevented as long as the door 1193a is moved to cover the lens 1180a under control of the second processor 1112.

According to various embodiments, as the lens 1180a of the camera module 1180 is opened or closed by movement of the door 1193a, the opened/closed state of the lens 1180a may be notified through the messages 1010 and 1020 on the display 1140 as shown in FIG. 10A or 10B.

An electronic device (e.g., the electronic device 100 of FIG. 1A or the electronic device 200 of FIG. 2) according to any one of various embodiments of the present disclosure may include a housing, at least one camera disposed inside the housing, at least one door disposed between the housing and a lens of the at least one camera, and a driving unit configured to open or close the lens of the at least one camera by slidably moving the door, in which the driving unit includes a linear actuator that linearly moves by applying a voltage.

According to various embodiments of the present disclosure, the electronic device may further include a switch disposed on an outer surface of the electronic device, in which the processor is configured to generate a control signal corresponding to the on state or the off state and transmit the control signal to the driving circuit, upon manipulation of the switch into the on state or the off state.

According to various embodiments of the present disclosure, the electronic device may further include a display displaying a screen on an exterior of the housing.

According to various embodiments of the present disclosure, the processor may be configured to control the display to display opening/closing of a lens of the at least one camera on the screen along with movement of the door.

According to any one of various embodiments, the processor may be configured to receive a camera application execution request, to transmit a user authentication information request in response to the camera application execution request, to receive the user authentication information in response to the user authentication information request, and to transmit a control signal for opening a lens of at least one camera to a driving circuit by slidably moving a door when determining that normal authentication has been made with respect to the received user authentication information.

According to any one of various embodiments, the user authentication information may include at least one of a password, fingerprint information, iris information, face information, or vein information.

According to any one of various embodiments, the processor may be configured to receive a camera application execution request, to identify a network connection state in response to the camera application execution request, to transmit a user authentication information request when determining that a network is connected, to receive the user authentication information in response to the user authentication information request, and to transmit a control signal for opening a lens of at least one camera to a driving circuit by slidably moving a door when determining that normal authentication has been made with respect to the received user authentication information.

According to any one of various embodiments, the electronic device may further include a power management module, in which the processor is configured to control the power management module to supply power to the camera in response to reception of the predetermined input, determine the power supplied to the camera, and transmit an electric signal for controlling the driving circuit to the driving circuit based on a result of the determination.

According to various embodiments of the present disclosure, the processor may be configured to transmit a control signal to the driving circuit to close the lens by slidably moving the door, when determining that the power of the electronic device switches from the on state to the off state.

According to various embodiments of the present disclosure, the processor may be configured to transmit a control signal to the driving circuit to open the lens by slidably moving the door, when determining that the power of the electronic device switches from the off state to the on state.

Figure 12:
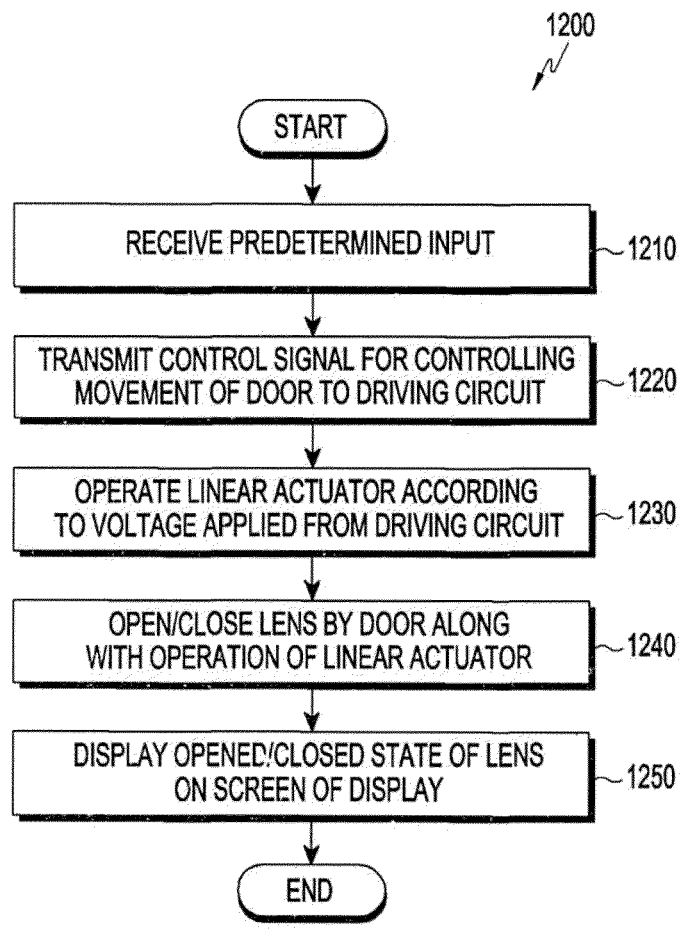
FIG. 12 is a flowchart showing operations of an electronic device, according to various embodiments of the present disclosure.

FIG. 12 is a flowchart showing operations of an electronic device, according to various embodiments of the present disclosure. Referring to FIG. 12, when the electronic device (e.g., the electronic device 100 of FIG. 1A or the electronic device 200 of FIG. 2) (e.g., the processor of the electronic device (e.g., the processor 1110 of FIG. 11)) receives a predetermined input in operation 1210, the electronic device may transmit a control signal for controlling movement of the door to the driving circuit in operation 1220. According to various embodiments, the predetermined input may include an input made through at least one key included in the keyboard (e.g., the keyboard 113 of FIG. 1A) or a combination of inputs made through a plurality of keys. According to various embodiments, the predetermined input may include a combination of inputs made through at least one key included in the keyboard and at least one button (e.g., a side button) disposed on the electronic device. According to various embodiments, the predetermined input may include a touch input made through a touch screen (e.g., the display 120) of the electronic device. According to various embodiments, the predetermined input may include an input made through a separate switch (e.g., the door opening/closing switch 111 of FIG. 1A) installed to open/close the door.

In operation 1230, the electronic device may operate the linear actuator according to a voltage applied from the driving circuit.

In operation 1240, the electronic device may move the door along with an operation of the linear actuator to open/close the lens.

In operation 1250, the electronic device may display an opened/closed state of the lens on the screen of the display.

Figure 13:
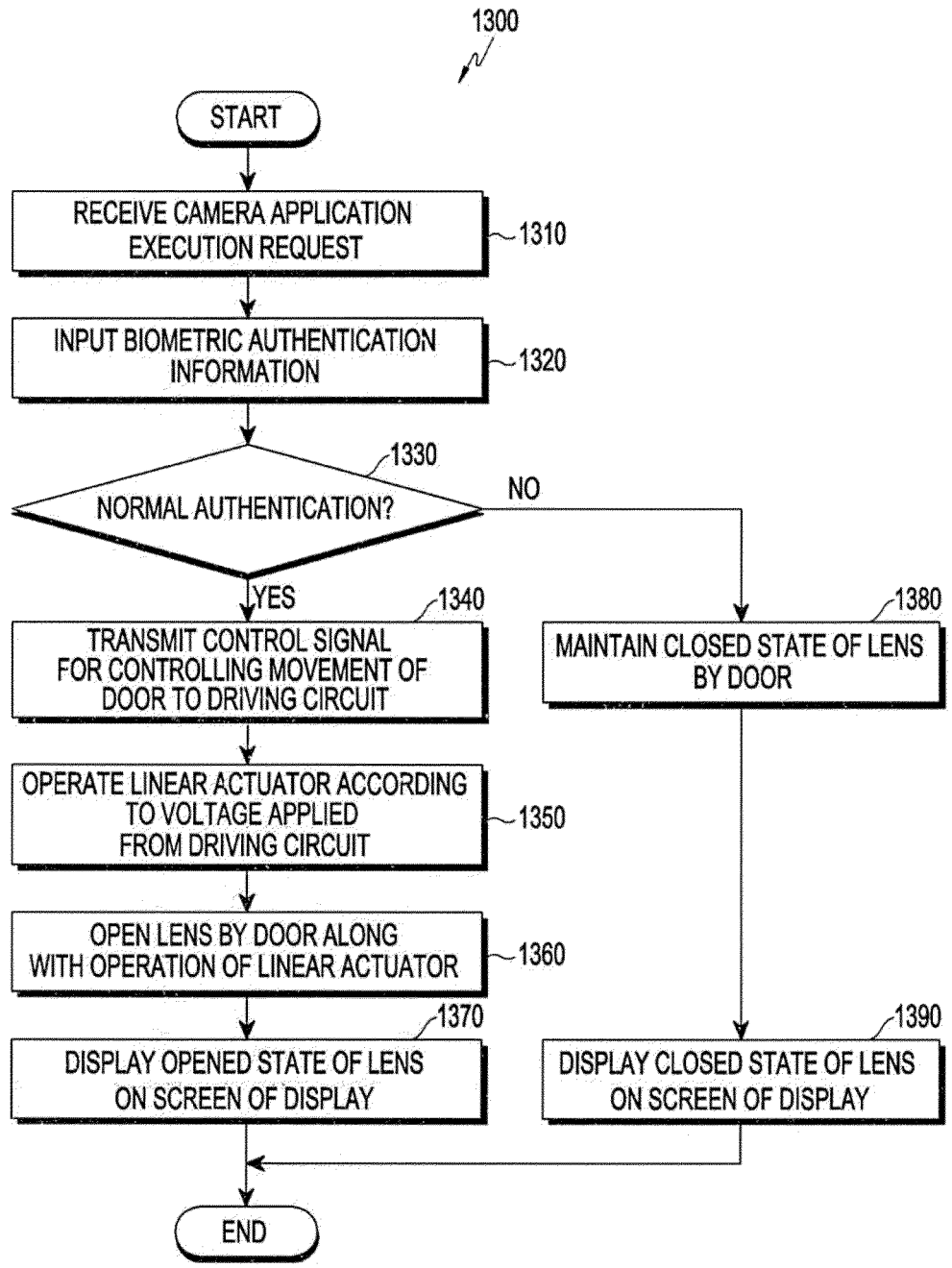
FIG. 13 is a flowchart showing operations of an electronic device, according to various embodiments of the present disclosure.

FIG. 13 is a flowchart showing operations of an electronic device, according to various embodiments of the present disclosure. Referring to FIG. 13, in operation 1310, the electronic device (e.g., the electronic device 100 of FIG. 1A or the electronic device 200 of FIG. 2) may receive a camera application execution request. According to various embodiments, the electronic device may transmit a biometric authentication information input request in response to the camera application execution request.

Upon input of the biometric authentication information in response to the camera application execution request in operation 1320, the electronic device may determine whether normal authentication has been made with respect to the input biometric authentication information in operation 1330.

When determining that normal authentication has been made with respect to the input biometric authentication information in operation 1330, the electronic device may transmit a control signal for controlling movement of the door to the driving circuit in operation 1340.

In operation 1350, the electronic device may operate the linear actuator according to a voltage applied from the driving circuit.

In operation 1360, the electronic device may move the door along with an operation of the linear actuator to open the lens.

In operation 1370, the electronic device may display an opened state of the lens on the screen of the display.

When determining that the input biometric authentication information has not been normally authenticated in operation 1330, the electronic device may maintain the lens as being closed by the door in operation 1380. According to various embodiments, the electronic device may stop or block the requested execution of the camera application when the input biometric authentication information has not been normally authenticated.

In operation 1390, the electronic device may display the closed state of the lens on the screen of the display.

Figure 14:
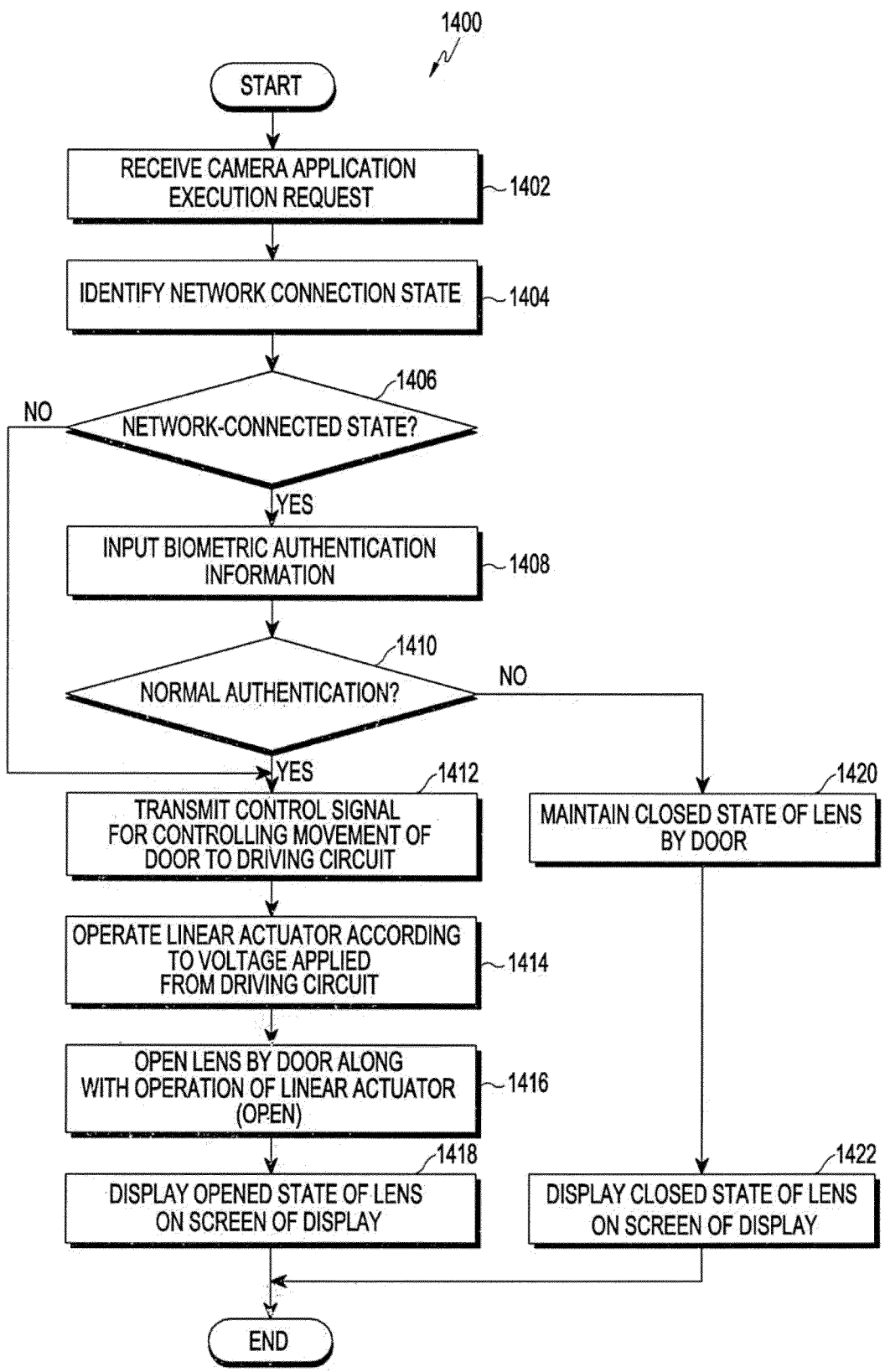
FIG. 14 is a flowchart showing operations of an electronic device, according to various embodiments of the present disclosure.

FIG. 14 is a flowchart showing operations of an electronic device, according to various embodiments of the present disclosure. Referring to FIG. 14, in operation 1402, the electronic device (e.g., the electronic device 100 of FIG. 1A or the electronic device 200 of FIG. 2) may receive a camera application execution request. According to various embodiments, the electronic device may identify a network connection state in response to the camera application execution request in operation 1404.

In operation 1406, when determining that the network is connected, the electronic device may transmit a biometric authentication information input request.

Upon input of the biometric authentication information in response to the camera application execution request in operation 1408, the electronic device may determine whether normal authentication has been made with respect to the input biometric authentication information in operation 1410.

When determining that normal authentication has been made with respect to the input biometric authentication information in operation 1330, the electronic device may transmit a control signal for controlling movement of the door to the driving circuit in operation 1412.

In operation 1414, the electronic device may operate the linear actuator according to a voltage applied from the driving circuit.

In operation 1416, the electronic device may move the door along with an operation of the linear actuator to open the lens.

In operation 1418, the electronic device may display an opened state of the lens on the screen of the display.

When determining that the input biometric authentication information has not been normally authenticated in operation 1410, the electronic device may maintain the lens as being closed by the door in operation 1420. According to various embodiments, the electronic device may stop or block the requested execution of the camera application when the input biometric authentication information has not been normally authenticated.

In operation 1422, the electronic device may display the closed state of the lens on the screen of the display.

When determining that the network is not connected in operation 1406, an additional authentication procedure may be omitted and the electronic device may proceed to operation 1412 to control the door, thus opening the lens.

Figure 15:
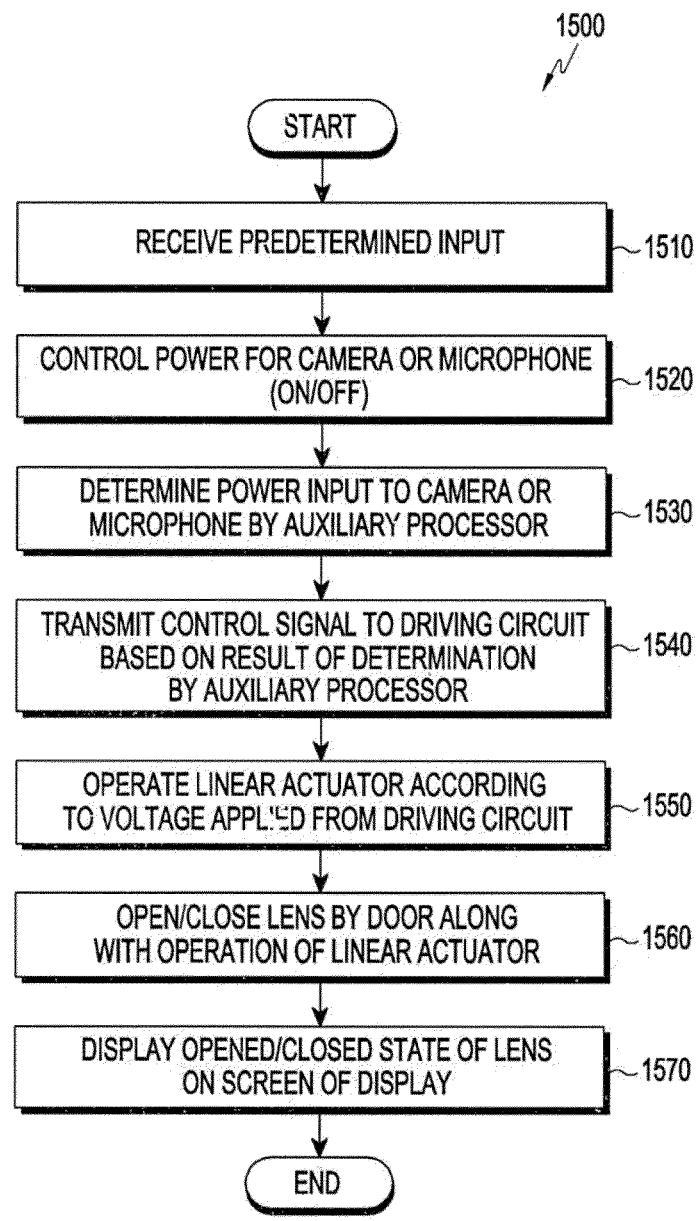
FIG. 15 is a flowchart showing operations of an electronic device, according to various embodiments of the present disclosure.

FIG. 15 is a flowchart showing operations of an electronic device, according to various embodiments of the present disclosure. Referring to FIG. 15, upon reception of a predetermined input in operation 1510, the electronic device (e.g., the electronic device 100 of FIG. 1A or the electronic device 200 of FIG. 2) may control the power of the camera or the microphone (e.g., an ON state or an OFF state) in operation 1520. According to various embodiments, the predetermined input may include an input made through at least one key included in the keyboard (e.g., the keyboard 113 of FIG. 1A) or a combination of inputs made through a plurality of keys. According to various embodiments, the predetermined input may include a combination of inputs made through at least one key included in the keyboard and at least one button (e.g., a side button) disposed on the electronic device. According to various embodiments, the predetermined input may include a touch input made through a touch screen (e.g., the display 120) of the electronic device. According to various embodiments, the predetermined input may include an input made through a separate switch (e.g., the door opening/closing switch 111 of FIG. 1A) installed to open/close the door. According to various embodiments, by manipulating a separate door opening/closing switch for opening/closing the door, the power input to the camera or the microphone may be directly controlled without a power control operation of the processor (e.g., the first processor 111 of FIG. 11).

In operation 1530, the auxiliary processor of the electronic device (e.g., the second processor 1112 of FIG. 11) may determine the power input to the camera or the microphone.

In operation 1540, the auxiliary processor of the electronic device may transmit a control signal to the driving circuit based on the determined power.

In operation 1550, the electronic device may operate the linear actuator according to a voltage applied from the driving circuit.

In operation 1560, the electronic device may move the door along with an operation of the linear actuator to open/close the lens.

In operation 1570, the electronic device may display an opened/closed state of the lens on the screen of the display.

Figure 16:
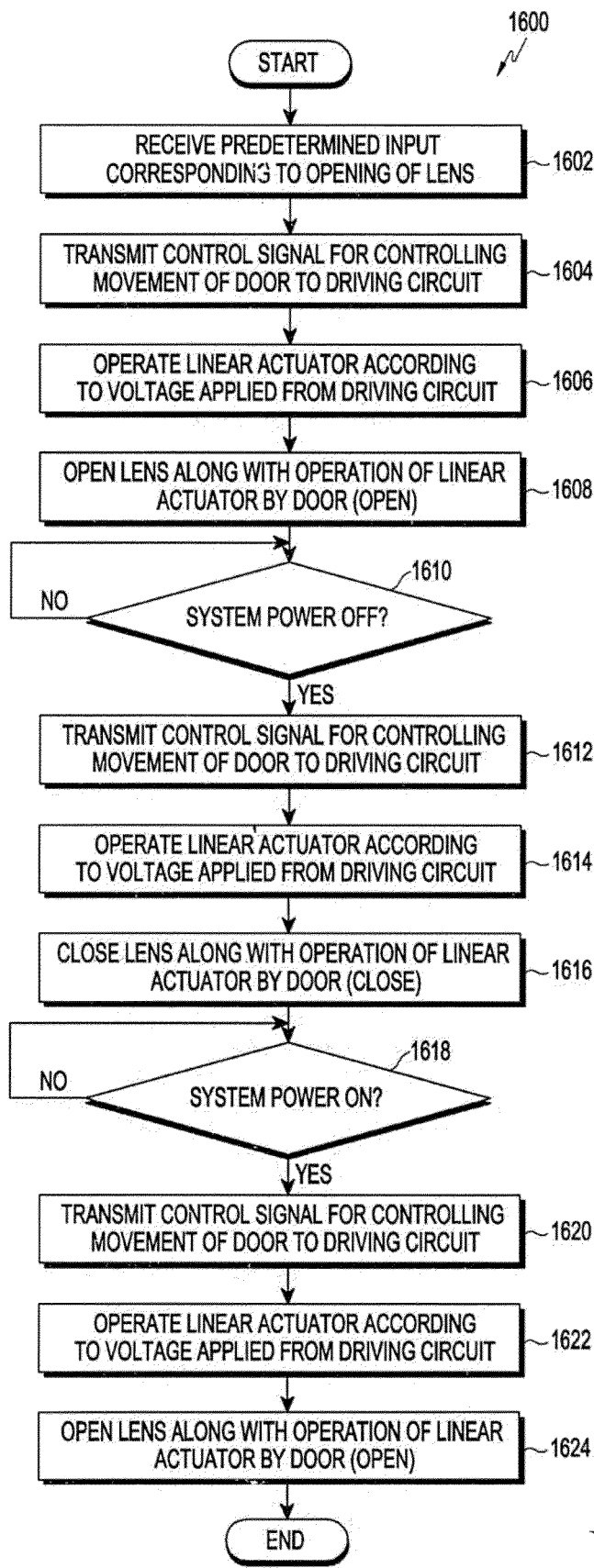
FIG. 16 is a flowchart showing operations of an electronic device, according to various embodiments of the present disclosure.

FIG. 16 is a flowchart showing operations of an electronic device, according to various embodiments of the present disclosure. Referring to FIG. 16, the electronic device (e.g., the electronic device 100 of FIG. 1A or the electronic device 200 of FIG. 2) may receive a predetermined input corresponding to opening of the lens in operation 1602, and transmit a control signal for controlling movement of the door to the driving circuit in operation 1604. According to various embodiments, the predetermined input may include an input made through at least one key included in the keyboard (e.g., the keyboard 113 of FIG. 1A) or a combination of inputs made through a plurality of keys. According to various embodiments, the predetermined input may include a combination of inputs made through at least one key included in the keyboard and at least one button (e.g., a side button) disposed on the electronic device. According to various embodiments, the predetermined input may include a touch input made through a touch screen (e.g., the display 120) of the electronic device. According to various embodiments, the predetermined input may include an input made through a separate switch (e.g., the door opening/closing switch 111 of FIG. 1A) installed to open/close the door.

In operation 1606, the electronic device may operate the linear actuator according to a voltage applied from the driving circuit.

In operation 1608, the electronic device may move the door along with an operation of the linear actuator to open the lens.

When the electronic device determines that the system power switches to the off state in operation 1610, the electronic device may transmit the control signal for controlling movement of the door to the driving circuit in operation 1612.

In operation 1614, the electronic device may operate the linear actuator according to a voltage applied from the driving circuit.

In operation 1616, the electronic device may move the door along with an operation of the linear actuator to switch the lens to the closed state (CLOSE).

When the electronic device determines that the system power switches from the off state to the on state in operation 1618, the electronic device may transmit the control signal for controlling movement of the door to the driving circuit in operation 1620.

In operation 1622, the electronic device may operate the linear actuator according to a voltage applied from the driving circuit.

In operation 1624, the electronic device may move the door along with an operation of the linear actuator to open the lens (OPEN).

A control method of an electronic device (e.g., the electronic device 100 of FIG. 1A or the electronic device 200 of FIG. 2) according to any one of various embodiments of the present disclosure may include receiving a camera application execution request, transmitting a user authentication information request in response to the camera application execution request, receiving the user authentication information in response to the user authentication information request, and transmitting a control signal for opening a lens of at least one camera to a driving circuit by slidably moving a door when determining that normal authentication has been made with respect to the received user authentication information.

According to various embodiments of the present disclosure, the control method may further include controlling a display to display opening/closing of a lens of the at least one camera on a screen along with movement of the door.

According to various embodiments of the present disclosure, the control method may further include identifying a network connection state in response to the camera application execution request and transmitting a request for user authentication information when determining that a network is connected.

According to various embodiments of the present disclosure, the control method may further include transmitting a control signal to the driving circuit to open the lens by slidably moving the door, when determining that the power of the electronic device switches from the on state to the off state.

According to various embodiments of the present disclosure, the control method may further include transmitting a control signal to the driving circuit to close the lens by slidably moving the door, when determining that the power of the electronic device switches from the off state to the on state.

Figure 17:
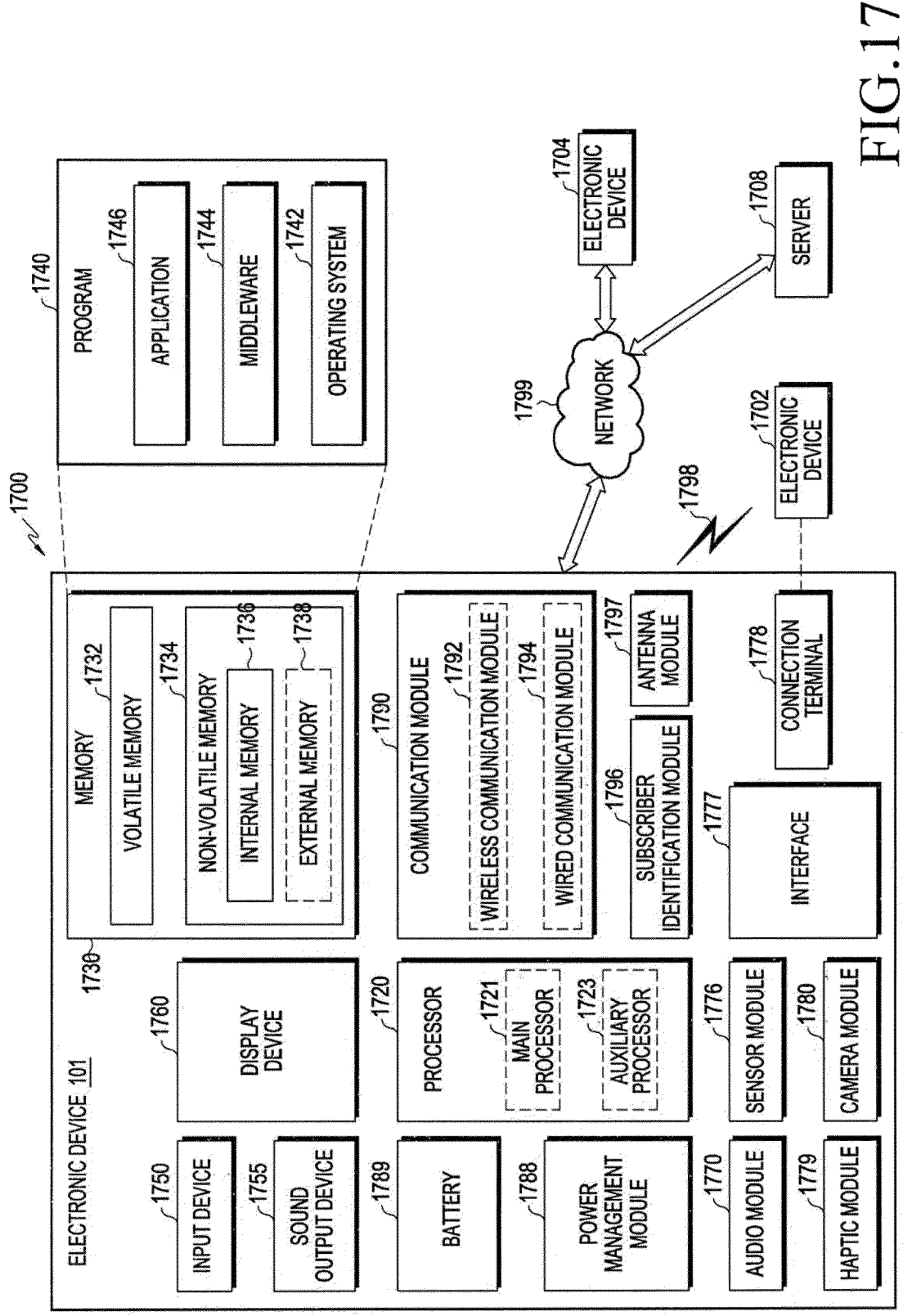
FIG. 17 is a block diagram of an electronic device in a network environment according to various embodiments.

FIG. 17 is a block diagram illustrating an electronic device 1701 in a network environment 1700 according to various embodiments. Referring to FIG. 17, the electronic device 1701 (e.g., the electronic device 100 of FIG. 1A or the electronic device 200 of FIG. 2) in the network environment 1700 may communicate with an electronic device 1702 via a first network 1798 (e.g., a short-range wireless communication network), or an electronic device 1704 or a server 1708 via a second network 1799 (e.g., a long-range wireless communication network). According to an embodiment, the electronic device 1701 may communicate with the electronic device 1704 via the server 1708. According to an embodiment, the electronic device 1701 may include a processor 1720, memory 1730, an input device 1750, a sound output device 1755, a display device 1760, an audio module 1770, a sensor module 1776, an interface 1777, a haptic module 1779, a camera module 1780, a power management module 1788, a battery 1789, a communication module 1790, a subscriber identification module (SIM) 1796, or an antenna module 1797. In some embodiments, at least one (e.g., the display device 1760 or the camera module 1780) of the components may be omitted from the electronic device 1701, or one or more other components may be added in the electronic device 1701. In some embodiments, some of the components may be implemented as single integrated circuitry. For example, the sensor module 1776 (e.g., a fingerprint sensor, an iris sensor, or an illuminance sensor) may be implemented as embedded in the display device 1760 (e.g., a display).

The processor 1720 may execute, for example, software (e.g., a program 1740) to control at least one other component (e.g., a hardware or software component) of the electronic device 1701 coupled with the processor 1720, and may perform various data processing or computation. According to one embodiment, as at least part of the data processing or computation, the processor 1720 may load a command or data received from another component (e.g., the sensor module 1776 or the communication module 1790) in volatile memory 1732, process the command or the data stored in the volatile memory 1732, and store resulting data in non-volatile memory 1734. According to an embodiment, the processor 1720 may include a main processor 1721 (e.g., a central processing unit (CPU) or an application processor (AP)), and an auxiliary processor 1723 (e.g., a graphics processing unit (GPU), an image signal processor (ISP), a sensor hub processor, or a communication processor (CP)) that is operable independently from, or in conjunction with, the main processor 1721. Additionally or alternatively, the auxiliary processor 1723 may be adapted to consume less power than the main processor 1721, or to be specific to a specified function. The auxiliary processor 1723 may be implemented as separate from, or as part of the main processor 1721.

The auxiliary processor 1723 may control at least some of functions or states related to at least one component (e.g., the display device 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active state (e.g., executing an application). According to an embodiment, the auxiliary processor 1723 (e.g., an image signal processor or a communication processor) may be implemented as part of another component (e.g., the camera module 1780 or the communication module 1790) functionally related to the auxiliary processor 1723.

The memory 1730 may store various data used by at least one component (e.g., the processor 1720 or the sensor module 1776) of the electronic device 1701. The various data may include, for example, software (e.g., the program 1740) and input data or output data for a command related thereto. The memory 1730 may include the volatile memory 1732 or the non-volatile memory 1734.

The program 1740 may be stored in the memory 1730 as software, and may include, for example, an operating system (OS) 1742, middleware 1744, or an application 1746.

The input device 1750 may receive a command or data to be used by other component (e.g., the processor 1720) of the electronic device 1701, from the outside (e.g., a user) of the electronic device 1701. The input device 1750 may include, for example, a microphone, a mouse, or a keyboard.

The sound output device 1755 may output sound signals to the outside of the electronic device 1701. The sound output device 1755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1760 may visually provide information to the outside (e.g., a user) of the electronic device 1701. The display device 1760 may include, for example, a display, a hologram device, or a projector and control circuitry to control a corresponding one of the display, hologram device, and projector. According to an embodiment, the display device 1760 may include touch circuitry adapted to detect a touch, or sensor circuitry (e.g., a pressure sensor) adapted to measure the intensity of force incurred by the touch.

The audio module 1770 may convert a sound into an electrical signal and vice versa. According to an embodiment, the audio module 1770 may obtain the sound via the input device 1750, or output the sound via the sound output device 1755 or a headphone of an external electronic device (e.g., an electronic device 1702) directly (e.g., wiredly) or wirelessly coupled with the electronic device 1701.

The sensor module 1776 may detect an operational state (e.g., power or temperature) of the electronic device 1701 or an environmental state (e.g., a state of a user) external to the electronic device 1701, and then generate an electrical signal or data value corresponding to the detected state. According to an embodiment, the sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly (e.g., wiredly) or wirelessly. According to an embodiment, the interface 1777 may include, for example, a high definition multimedia interface (HDMI), a universal serial bus (USB) interface, a secure digital (SD) card interface, or an audio interface.

A connecting terminal 1778 may include a connector via which the electronic device 1701 may be physically connected with the external electronic device (e.g., the electronic device 1702). According to an embodiment, the connecting terminal 1778 may 1778 may include, for example, a HDMI connector, a USB connector, a SD card connector, or an audio connector (e.g., a headphone connector).

The haptic module 1779 may convert an electrical signal into a mechanical stimulus (e.g., a vibration or motion) or electrical stimulus which may be recognized by a user via his tactile sensation or kinesthetic sensation. According to an embodiment, the haptic module 1779 may include, for example, a motor, a piezoelectric element, or an electric stimulator.

The camera module 1780 may capture a still image or moving images. According to an embodiment, the camera module 1780 may include one or more lenses, image sensors, image signal processors, or flashes.

The power management module 1788 may manage power supplied to the electronic device 1701. According to one embodiment, the power management module 188 may be implemented as at least part of, for example, a power management integrated circuit (PMIC).

The battery 1789 may supply power to at least one component of the electronic device 1701. According to an embodiment, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that are operable independently from the processor 1720 (e.g., the application processor (AP)) and supports a direct (e.g., wired) communication or a wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device via the first network 1798 (e.g., a short-range communication network, such as Bluetooth™, Wireless-Fidelity (Wi-Fi) direct, or infrared data association (IrDA)) or the second network 1799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1792 may identify and authenticate the electronic device 1701 in a communication network, such as the first network 1798 or the second network 1799, using subscriber information (e.g., international mobile subscriber identity (IMSI)) stored in the subscriber identification module 1796.

The antenna module 1797 may transmit or receive a signal or power to or from the outside (e.g., the external electronic device). According to an embodiment, the antenna module 1797 may include one or more antennas, and, therefrom, at least one antenna appropriate for a communication scheme used in the communication network, such as the first network 1798 or the second network 1799, may be selected, for example, by the communication module 1790. The signal or the power may then be transmitted or received between the communication module 1790 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1701 and the external electronic device 1704 via the server 1708 coupled with the second network 1799. Each of the electronic device 1702 and the electronic device 1704 may be a device of the same type as, or a different type, from the electronic device 1701. According to an embodiment, all or some of operations to be executed at the electronic device 1701 may be executed at one or more of the external electronic devices 1702, 1704, or 1708. For example, when the electronic device 1701 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1701. The electronic device 1701 may provide the outcome, with or without further processing of the outcome, as at least part of a reply to the request. To that end, a cloud computing, distributed computing, or client-server computing technology may be used, for example.

Figure 18:
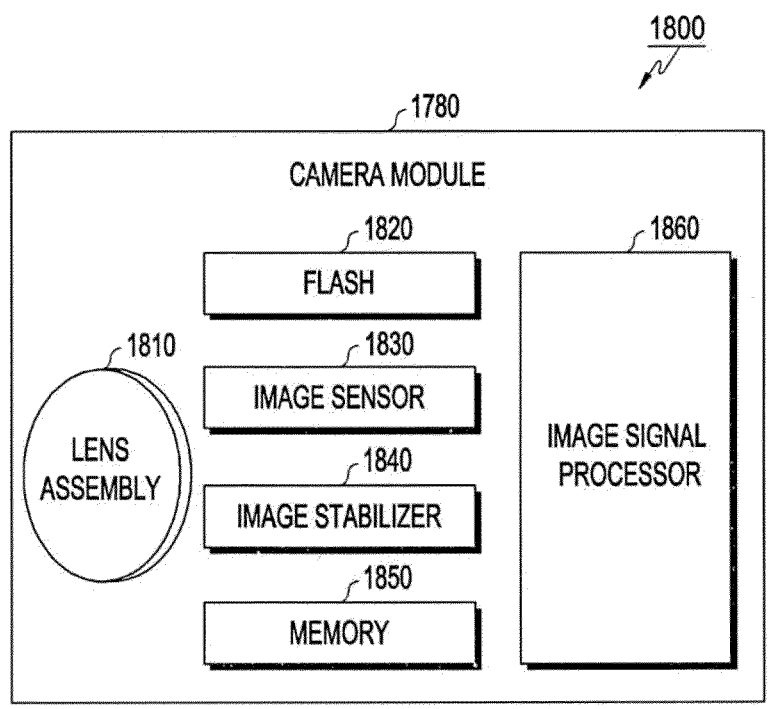
FIG. 18 is a block diagram of a camera module according to various embodiments of the present disclosure.

FIG. 18 is a block diagram 1800 of a camera module 1780 according to various embodiments. Referring to FIG. 18, the camera module 1780 may include a lens assembly 1810, a flash 1820, an image sensor 1830, an image stabilizer 1840, memory 1850 (e.g., buffer memory), or an image signal processor 1860. The lens assembly 1810 may collect light emitted or reflected from an object whose image is to be taken. The lens assembly 1810 may include one or more lenses. According to an embodiment, the camera module 1780 may include a plurality of lens assemblies 1810. In such a case, the camera module 1780 may form, for example, a dual camera, a 360-degree camera, or a spherical camera. Some of the plurality of lens assemblies 1810 may have the same lens attribute (e.g., view angle, focal length, auto-focusing, f number, or optical zoom), or at least one lens assembly may have one or more lens attributes different from those of another lens assembly. The lens assembly 1810 may include, for example, a wide-angle lens or a telephoto lens.

The flash 1820 may emit light that is used to reinforce light reflected from an object. According to an embodiment, the flash 1820 may include one or more light emitting diodes (LEDs) (e.g., a red-green-blue (RGB) LED, a white LED, an infrared (IR) LED, or an ultraviolet (UV) LED) or a xenon lamp. The image sensor 1830 may obtain an image corresponding to an object by converting light emitted or reflected from the object and transmitted via the lens assembly 1810 into an electrical signal. According to an embodiment, the image sensor 1830 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 1830 may be implemented using, for example, a charged coupled device (CCD) sensor or a complementary metal oxide semiconductor (CMOS) sensor.

The image stabilizer 1840 may move the image sensor 1830 or at least one lens included in the lens assembly 1810 in a particular direction, or control an operational attribute (e.g., adjust the read-out timing) of the image sensor 1830 in response to the movement of the camera module 1780 or the electronic device 1701 including the camera module 1780. This allows compensating for at least part of a negative effect (e.g., image blurring) by the movement on an image being captured. According to an embodiment, the image stabilizer 1840 may sense such a movement by the camera module 1780 or the electronic device 1701 using a gyro sensor (not shown) or an acceleration sensor (not shown) disposed inside or outside the camera module 1780. According to an embodiment, the image stabilizer 1840 may be implemented, for example, as an optical image stabilizer. The memory 1850 may store, at least temporarily, at least part of an image obtained via the image sensor 1830 for a subsequent image processing task. For example, when image capturing is delayed due to shutter lag or multiple images are quickly captured, a raw image obtained (e.g., a Bayer-patterned image, a high-resolution image) may be stored in the memory 1850, and its corresponding copy image (e.g., a low-resolution image) may be previewed via the display device 1760. Thereafter, when a specified condition is met (e.g., by a user's input or system command), at least part of the raw image stored in the memory 1850 may be obtained and processed, for example, by the image signal processor 1860. According to an embodiment, the memory 1850 may be configured as at least part of the memory 1730 or as a separate memory that is operated independently from the memory 1730.

The image signal processor 1860 may perform one or more image processing with respect to an image obtained via the image sensor 1830 or an image stored in the memory 1850. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1860 may perform control (e.g., exposure time control or read-out timing control) with respect to at least one (e.g., the image sensor 1830) of the components included in the camera module 1780. An image processed by the image signal processor 1860 may be stored back in the memory 1850 for further processing, or may be provided to an external component (e.g., the memory 1730, the display device 1760, the electronic device 1702, the electronic device 1704, or the server 1708) outside the camera module 1780. According to an embodiment, the image signal processor 1860 may be configured as at least part of the processor 1720, or as a separate processor that is operated independently from the processor 1720. When the image signal processor 1860 is configured as a separate processor from the processor 1720, at least one image processed by the image signal processor 1860 may be displayed, by the processor 1720, via the display device 1760 as it is or after being further processed.

According to an embodiment, the electronic device 1701 may include a plurality of camera modules 1780 having different attributes or functions. In such a case, at least one of the plurality of camera modules 1780 may form, for example, a wide-angle camera and at least another of the plurality of camera modules 1780 may form a telephoto camera. Similarly, at least one of the plurality of camera modules 1780 may form, for example, a front camera and at least another of the plurality of camera modules 1780 may form a rear camera.

Figure 19:
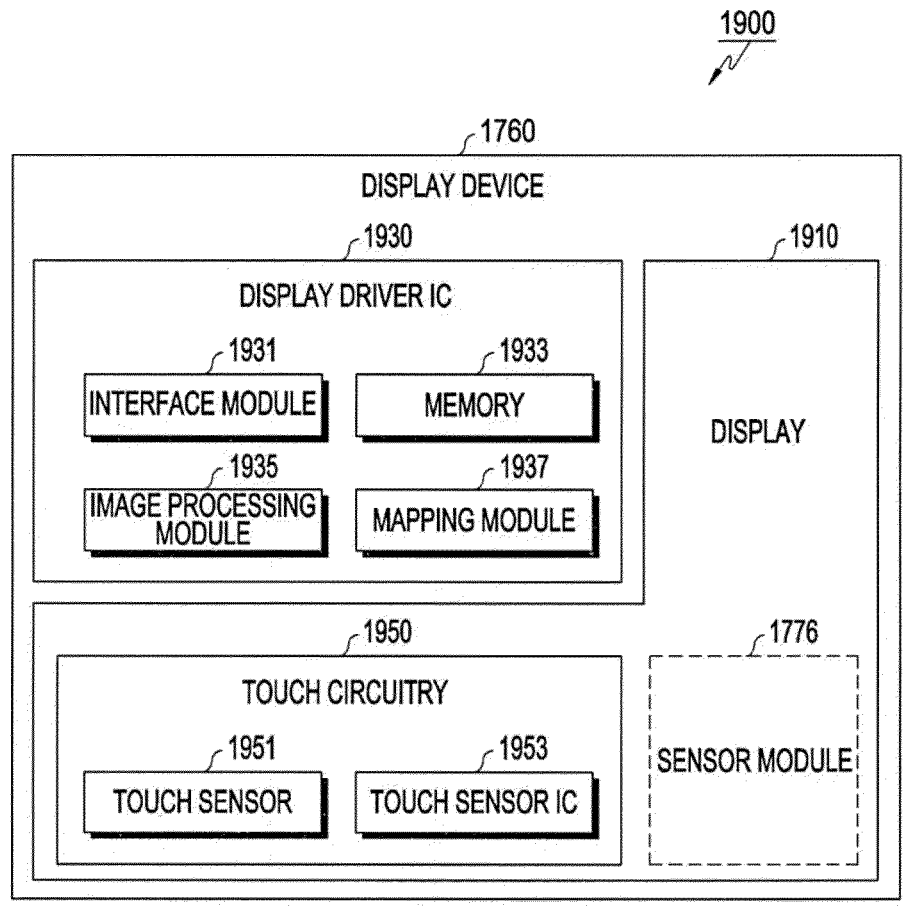
FIG. 19 is a block diagram of a display device according to various embodiments of the present disclosure.

FIG. 19 is a block diagram 1900 illustrating the display device 1760 according to various embodiments. Referring to FIG. 19, the display device 1760 may include a display 1910 and a display driver integrated circuit (IC) (DDI) 1930 to control the display 210. The DDI 1930 may include an interface module 1931, memory 1933 (e.g., buffer memory), an image processing module 1935, or a mapping module 1937. The DDI 1930 may receive image information that contains image data or an image control signal corresponding to a command to control the image data from another component of the electronic device 1701 via the interface module 1931. For example, according to an embodiment, the image information may be received from the processor 1720 (e.g., the main processor 1721 (e.g., an application processor)) or the auxiliary processor 1723 (e.g., a graphics processing unit) operated independently from the function of the main processor 1721. The DDI 1930 may communicate, for example, with touch circuitry 1950 or the sensor module 1776 via the interface module 1931. The DDI 1930 may also store at least part of the received image information in the memory 1933, for example, on a frame by frame basis. The image processing module 1935 may perform pre-processing or post-processing (e.g., adjustment of resolution, brightness, or size) with respect to at least part of the image data, for example, based at least in part on one or more characteristics of the image data or one or more characteristics of the display 1910. The mapping module 1937 may generate a voltage value or a current value corresponding to the image data pre-processed or post-processed by the image processing module 1735. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 1910. At least some pixels of the display 1910 may be driven, for example, based at least in part on the voltage value or the current value such that visual information (e.g., a text, an image, or an icon) corresponding to the image data may be displayed via the display 1910.

According to an embodiment, the display device 1760 may further include the touch circuitry 1950. The touch circuitry 1950 may include a touch sensor 1951 and a touch sensor IC 1953 to control the touch sensor 251. The touch sensor IC 1953 may 1953 may control the touch sensor 1951 to sense a touch input or a hovering input with respect to a certain position on the display 1910. For example, the touch sensor IC 1953 may detect a touch input or a hovering input by measuring a change in a signal (e.g., a voltage, a quantity of light, a resistance, or a quantity of one or more electric charges) corresponding to the certain position on the display 1910. The touch sensor IC 1953 may provide information (e.g., a position, an area, a pressure, or a time) indicative of the touch input or the hovering input detected via the touch sensor 251 to the processor 1720. According to an embodiment, at least part (e.g., the touch sensor IC 1953) of the touch circuitry 1950 may be formed as part of the display 1910 or the DDI 1930, or as part of another component (e.g., the auxiliary processor 1723) disposed outside the display device 1760.

According to an embodiment, the display device 1760 may further include at least one sensor (e.g., a fingerprint sensor, an iris sensor, a pressure sensor, or an illuminance sensor) of the sensor module 1776 or a control circuit for the at least one sensor. In such a case, the at least one sensor or the control circuit for the at least one sensor may be embedded in one portion of the display device 1760 (e.g., the display 1910 or the DDI 1930) or one portion of the touch circuitry 1950). For example, when the sensor module 1776 embedded in the display device 1760 includes a biometric sensor (e.g., a fingerprint sensor), the biometric sensor may obtain biometric information (e.g., a fingerprint image) corresponding to a touch input received via a portion of the display 1910. As another example, when the sensor module 1776 embedded in the display device 1760 includes a pressure sensor, the pressure sensor may obtain pressure information corresponding to a touch input received via a partial or whole area of the display 1910. According to an embodiment, the touch sensor 1951 or the sensor module 1776 may be disposed between pixels in a pixel layer of the display 1910, or over or under the pixel layer.

Figure 20:
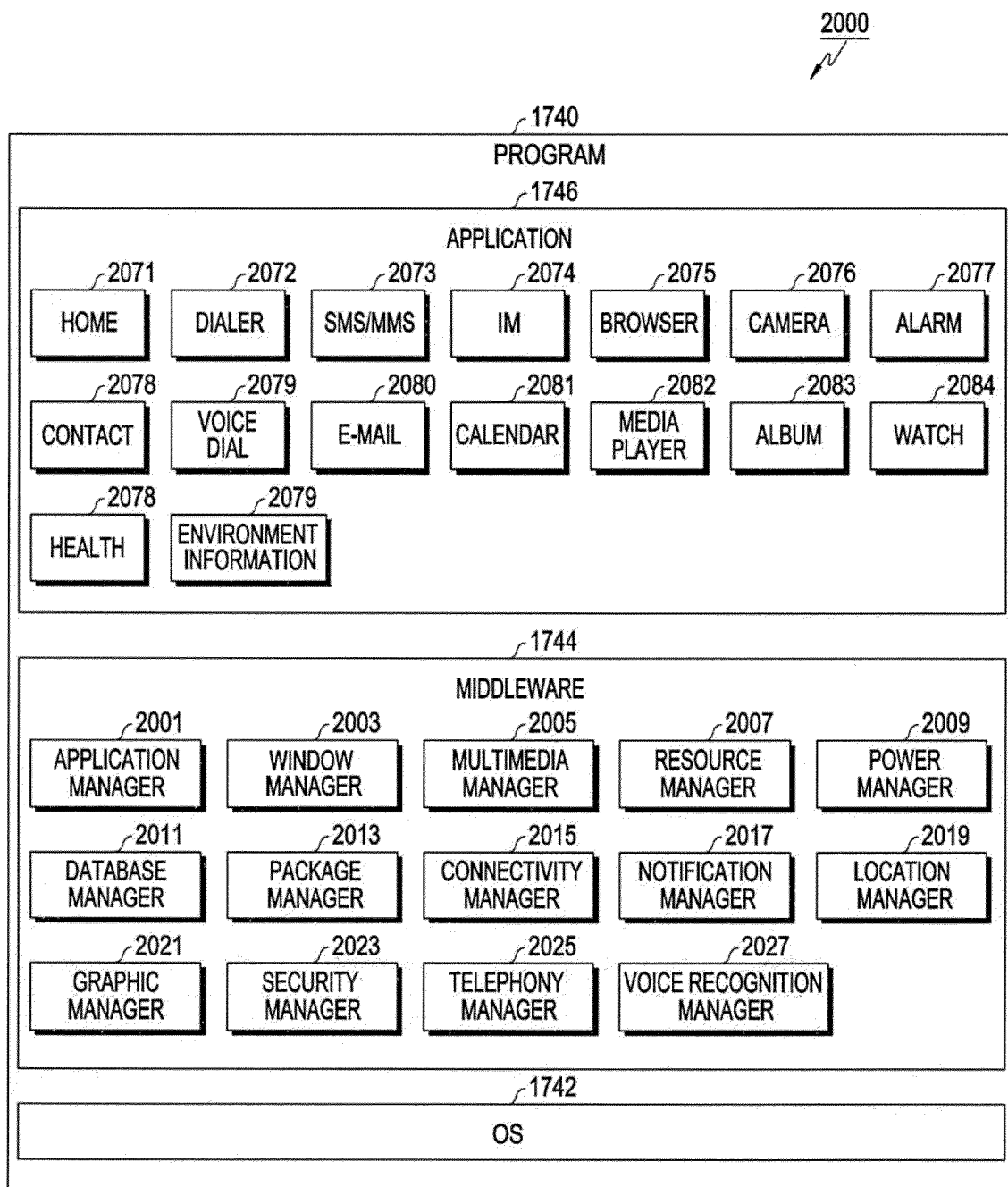
FIG. 20 is a block diagram of a program according to various embodiments of the present disclosure.

FIG. 20 is a block diagram 2000 of the program 1740 according to various embodiments. According to an embodiment, the program 1740 may include an operating system (OS) 1742 to control one or more resources of the electronic device 1701, middleware 1744, or an application 1746 executable in the OS 1742. The OS may include Android™, iOS™, Windows™, Symbian™, Tizen™, or Bada™. At least part of the program 1740, for example, may be pre-loaded on the electronic device 1701 during manufacture, or may be downloaded from or updated by an external electronic device (e.g., the electronic device 1702 or 1704, or the server 1708) during use by a user.

The OS 1742 may control management (e.g., allocating or deallocation) of one or more system resources (e.g., process, memory, or power source) of the electronic device 1701. The OS 1742, additionally or alternatively, may include one or more driver programs to drive other hardware devices of the electronic device 1701, for example, an input device 1750, an sound output device 1755, the display device 1760, the audio module 1770, the sensor module 1776, the interface 1777, the haptic module 1779, the camera module 1780, the power management module 1788, the battery 1789, the communication module 1790, the subscriber identification module 1796, or the antenna module 1797.

The middleware 1744 may provide various functions to the application 1746 such that a function or information provided from one or more resources of the electronic device 1701 may be used by the application 1746. The middleware 1744 may include, for example, an application manager 2001, a window manager 2003, a multimedia manager 2005, a resource manager 2007, a power manager 2009, a database manager 2011, a package manager 2013, a connectivity manager 2015, a notification manager 2017, a location manager 2019, a graphic manager 2021, a security manager 2023, a telephony manager 2025, or a voice recognition manager 2027.

The application manager 2001 may manage a life cycle of the applications 1746. The window manager 2003, for example, may manage one or more graphical user interface (GUI) resources that are used on a screen. The multimedia manager 2005, for example, may identify one or more formats to be used to play media files, and may encode or decode a corresponding one of the media files using a codec appropriate for a corresponding format selected from the one or more formats. The resource manager 2007, for example, may manage the source code of the application 1746 or a memory space of the memory 1730. The power manager 2009, for example, may manage the capacity, temperature, or power of the battery 1789, and determine or provide related information to be used for the operation of the electronic device 1701 based at least in part on corresponding information of the capacity, temperature, or power of the battery 1789. According to an embodiment, the power manager 2009 may interwork with a basic input/output system (BIOS) (not shown) of the electronic device 1701.

The database manager 2011, for example, may generate, search, or change a database to be used by the application 1746. The package manager 2013, for example, may manage installation or update of an application that is distributed in the form of a package file. The connectivity manager 2015, for example, may manage a wireless connection or a direct connection between the electronic device 1701 and the external electronic device. The notification manager 2017, for example, may provide a function to notify a user of an occurrence of a specified event (e.g., an incoming call, message, or alert). The location manager 2019, for example, may manage locational information on the electronic device 1701. The graphic manager 2021, for example, may manage one or more graphic effects to be offered to a user or a user interface related to the one or more graphic effects.

The security manager 2023 may provide, for example, system security or user authentication. The telephony manager 2025, for example, may manage a voice call function or a video call function provided by the electronic device 1701. The voice recognition manager 2027, for example, may transmit a user's voice data to the server 1708, and receive, from the server 1708, a command corresponding to a function to be executed on the electronic device 1701 based at least in part on the voice data, or text data converted based at least in part on the voice data. According to an embodiment, the middleware 2044 may dynamically delete some existing components or add new components. According to an embodiment, at least part of the middleware 1744 may be included as part of the OS 1742 or may be implemented as another software separate from the OS 1742.

The application 1746 may include one or more applications capable of providing a function, for example, a home application 2051, a dialer application 2053, a short messaging service/multimedia messaging service (SMS/MMS) application 2055, an instant message (IM) application 2057, a browser application 2059, a camera application 2061, an alarm application 2063, a contact application 2065, a voice dial application 2067, an e-mail application 2069, a calendar application 2071, a media player application 2073, an album application 2075, a watch application 2077, a health application 2079 (e.g., an application for measuring biometric information such as an exercise amount, a blood sugar, etc.), or an environment information application 2081 (e.g., an application for measuring air pressure, humidity, or temperature information or the like). According to an embodiment, the application 1746 may further include an information exchanging application (not shown) that is capable of supporting information exchange between the electronic device 1701 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 2069) of the electronic device 1701 to the external electronic device. Additionally or alternatively, the notification relay application may receive notification information from the external electronic device and provide the notification information to a user of the electronic device 1701.

The device management application may control the power (e.g., turn-on or turn-off) or the function (e.g., adjustment of brightness, resolution, or focus of the display device 1760 or the camera module 1780) of the external electronic device communicating with the electronic device 1701 or some component thereof (e.g., the display device 1760 or the camera module 1780). The device management application, additionally or alternatively, may support installation, delete, or update of an application running on the external electronic device.

An electronic device according to various embodiments may be one of various types of electronic devices, according to various embodiments of the present disclosure. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that when an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Various embodiments as set forth herein may be implemented as software (e.g., the program 1740) including one or more instructions that are stored in a storage medium (e.g., internal memory 1736 or external memory 1738) that is readable by a machine (e.g., the electronic device 1701). For example, a processor (e.g., the processor 1720) of the machine (e.g., the electronic device 1701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Each of the foregoing elements described in various embodiments of the present disclosure may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

As used herein, the term "module" may mean, for example, a unit including one of or a combination of two or more of hardware, software, and firmware. The "module" may be interchangeably used with other terms, for example, "logic," "logic block," "component," "circuitry", etc. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with a command stored in a computer-readable storage medium in the form of a programming module. When the instructions are executed by one or more processors, the one or more processors may perform functions corresponding to the instructions. The computer-readable storage medium may be, for example, a memory.

The computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, random access memory (RAM), flash memory, etc.), and so forth. Further, the program instructions may include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

What is claimed:

1. An electronic device comprising:
   a housing;
   a camera disposed inside the housing;
   a door disposed with respect to a lens of the camera;
   a driving unit configured to slidably move the door so as to uncover or cover the lens of the camera, wherein the driving unit comprises a linear actuator;
   a display; and
   at least one processor electrically connected to the camera, the driving unit and the display,
   wherein the at least one processor is configured to:
   in response to reception of a first input from input circuitry of the electronic device while the door is covering the lens of the camera, transmit a control signal to the driving unit to slidably move the door so as to uncover the lens, and
   control the display to display an indication of the lens of the camera being uncovered by the door according to the lens of the camera being uncovered by movement of the door in response to the first input.

2. The electronic device of claim 1, wherein the at least one processor is further configured to:
   in response to reception of a second input while the door is uncovering the lens of the camera, transmit a control signal to the driving unit to slidably move the door so as to cover the lens, and
   control the display to display an indication of the lens of the camera being covered by the door according to the lens of the camera being covered by movement of the door in response to the second input.

3. The electronic device of claim 1, wherein the driving unit comprises:
   a moving unit coupled to the linear actuator and slidably moving according to linear movement of the linear actuator; and
   a support member supporting at least one of the linear actuator or the moving unit.

4. The electronic device of claim 3, wherein the driving unit further comprises:
   a sliding unit coupled with the door and slidably moving according to movement of the linear actuator; and
   a link unit disposed between the sliding unit and the moving unit and slidably moving the sliding unit by delivering slidable movement of the moving unit to the sliding unit.

5. The electronic device of claim 1, wherein the door comprises a sheet in a film form or instrument with a thin thickness.

6. The electronic device of claim 1, wherein the at least one processor is further configured to:
   identify a request for execution of a camera application;
   in response to the request for execution of the camera application, obtain user authentication information; and
   transmit the control signal to the driving unit to slidably move the door so as to uncover the lens, based on identifying that normal authorization has been performed by the user authentication information.

7. The electronic device of claim 6, wherein the at least one processor is further configured to:
   keep that the door is covering the lens, based on identifying that normal authorization has been not performed by the user authentication information.

8. The electronic device of claim 2,
   wherein the first input and the second input are an input of at least one of a button, a switch, at least one key included a keyboard, or a touch screen.

9. A method in an electronic device comprising:
   in response to reception of a first input from input circuitry of the electronic device while a door of the electronic device is covering a lens of a camera of the electronic device, transmitting a control signal to a driving unit of the electronic device to slidably move the door so as to uncover the lens; and
   control a display of the electronic device to display an indication of the lens of the camera being uncovered by the door according to the lens of the camera being uncovered by movement of the door in response to the first input, wherein the driving unit comprises a linear actuator.

10. The method of claim 9, further comprising:
    in response to reception of a second input while the door is uncovering the lens of the camera, transmitting a control signal to the driving unit to slidably move the door so as to cover the lens, and
    controlling the display to display an indication of the lens of the camera being covered by the door according to the lens of the camera being covered by movement of the door in response to the second input.

11. The method of claim 9, further comprising:
identifying a request for execution of a camera application;
in response to the request for execution of the camera application, obtaining user authentication information; and
transmitting the control signal to the driving unit to slidably move the door so as to uncover the lens, based on identifying that normal authorization has been performed by the user authentication information.

12. The method of claim 11, further comprising:
maintaining a state that the door is covering the lens, based on identifying that normal authorization has been not performed by the user authentication information.

13. The method of claim 10, wherein the first input and the second input are an input of at least one of a button, a switch, at least one key included a keyboard, or a touch screen.

\* \* \* \* \*